United States Patent [19]
Kato et al.

[11] Patent Number: 5,430,561
[45] Date of Patent: Jul. 4, 1995

[54] OPTICAL SPACE SWITCH EMPLOYING 2 PARALLEL DIFFRACTION GRATINGS AND A POLARIZATION ROTATING ELEMENT

[75] Inventors: Masayuki Kato; Hiroyasu Ito, both of Kawasaki, Japan

[73] Assignee: Fujitsu Limited, Kawasaki, Japan

[21] Appl. No.: 910,779

[22] Filed: Jul. 8, 1992

[30] Foreign Application Priority Data

Jul. 17, 1991 [JP] Japan .................. 3-202392
Jul. 17, 1991 [JP] Japan .................. 3-202393

[51] Int. Cl.⁶ .......................... G02F 1/13; G02F 1/137
[52] U.S. Cl. .................................. 359/39; 359/30; 359/302; 359/298; 359/315; 359/494; 359/498; 359/566; 359/618; 385/11; 385/37
[58] Field of Search .............. 359/39, 93, 94, 95, 359/40, 11, 301, 302, 303, 304, 298, 315, 316, 558, 127, 130, 618, 495, 498, 566, 629, 569; 385/8, 9, 10, 16, 17, 21, 37

[56] References Cited

U.S. PATENT DOCUMENTS

| | | | |
|---|---|---|---|
| 3,329,474 | 7/1967 | Harris et al. | 359/316 |
| 3,614,191 | 10/1971 | Sakaguchi | 359/11 |
| 3,650,602 | 3/1972 | Lee et al. | 359/316 |
| 4,422,088 | 12/1983 | Gfeller | 385/10 |
| 4,813,769 | 3/1989 | Baker | 359/39 |
| 4,850,682 | 7/1989 | Gerritsen | 359/95 |
| 4,917,452 | 9/1990 | Liebowitz | 359/39 |
| 4,969,717 | 11/1990 | Mallinsoh | 359/39 |
| 5,071,232 | 12/1991 | Kato et al. | 359/315 |
| 5,107,357 | 4/1992 | Cassady et al. | 359/95 |
| 5,134,516 | 7/1992 | Lehoreau et al. | 359/301 |
| 5,159,473 | 10/1992 | Feldman | 359/11 |
| 5,162,944 | 12/1990 | Yamamoto et al. | |
| 5,193,130 | 3/1993 | Nishiwaki et al. | 385/8 |
| 5,204,771 | 4/1993 | Koya | 359/495 |
| 5,258,871 | 11/1993 | Gupta | 359/566 |

FOREIGN PATENT DOCUMENTS 0261725 11/1986 Japan .

OTHER PUBLICATIONS

R. Kostuk, et al., *Polarization properties of substrate-mode holographic interconnects*, Applied Optics, 10 Sep. 1990, vol. 29, No. 26, pp. 3848–3854.

M. Taylor, et al., *Optically Interconnected Switching Networks*, Journal of Lightwave Technology, Jun. 1991, vol. 9, No. 6, pp. 791–798.

K. Hogari et al., *Two-Dimensional Multichannel Optical Switch*, Proceedings on the International Topical Meeting on Photonic Switching, 12–14 Apr. 1990, vol. 29, pp. 204–207.

K. Noguchi et al., *A Rearrangeable Multichannel Free-Space Optical Switch Using a Polarization-Multiplexing Technique*, Proceedings of the International Topical Meeting on Photonic Switching, 12–14 Apr. 1990, vol. 29., pp. 208–211.

J. Midwinter, *Communications, VLSI, Optoelectronics and Self Routing Switches*, Proceedings, International Switching Symposium, 28 May–1 Jun. 1990, vol. III, pp. 37–41.

G. DeBiase, *Optical multistage interconnection networks for large-scale multiprocessor systems*, Applied Optics, 15 May 1988, vol. 27, No. 10, pp. 2017–2021.

J. McManus, et al., *Switched holograms for reconfigurable optical interconnection: demonstration of a prototype device*, Applied Optics, 15 Oct. 1988, vol. 27, No. 20, pp. 4244–4250.

(List continued on next page.)

*Primary Examiner*—William L. Sikes
*Assistant Examiner*—Kenneth Parker
*Attorney, Agent, or Firm*—Staas & Halsey

[57] ABSTRACT

The invention provides an optical space switch device which provides variable interconnection of one- or two-dimensionally spatially multiplexed optical signals. The optical space switch device comprises a plurality of optical space switch stages stacked to form a multi-input multi-output optical space switch. Each of the optical space switch stages comprises a plurality of 2-input 2-output optical switches, each of which comprises a polarization control layer and an optical path shifting layer. The optical path shifting layer has a by-pass mode in which it outputs beams of light along optical axes and an exchange mode in which it shifts beams of light by diffraction.

24 Claims, 19 Drawing Sheets

OTHER PUBLICATIONS

L. Rudolph, et al., *An Optical Interconnection Network with 3-D Layout and Distributed Control*, Proceedings, Optical Interconnections and Networks (ECO3), 14–15 Mar. 1990, vol. 1281, pp. 54–65.

M. Yamaguchi, "Scale Estimation of a Two-Dimensional Optical Concentrator Using Position Shifters," Photonic Switching II, Proceedings of the International Topical Meeting, Kobe, Japan, Apr. 12–14, 1990.

K. Noguchi et al., "A Rearrangeable Multichannel Free-Space Optical Switch Using a Polarization-Multiplexing Technique," Photonic Switching II, Proceedings of the International Topical Meeting, Kobe, Japan, Apr. 12–14, 1990.

K. Noguchi et al., "Rearrangeable Multichannel Free-Space Optical Switch Using Polarization Multiplexing Technique," Electronic Letters, vol. 26, No. 17, Aug. 16, 1990, pp. 1325–1326.

R. K. Kostuk et al., "Polarization properties of substrate-mode holographic interconnects," Applied Optics, vol. 29, No. 26, Sep. 10, 1990, pp. 3848–3854.

T. Nakagami et al., "Multistage Reconfigurable Optical Interconnection Network Using Polarization Switch Arrays," Photonic Switching, vol. 8, Procedings of the International Topical Meeting, Mar. 6–8, 1991, Salt Lake City, Utah, pp. 67–71.

POLARIZATION CONTROLLING ELEMENT

FIRST STAGE FIRST LAYER

FIRST STAGE SECOND LAYER

POLARIZATION CONTROLLING ELEMENT

SECOND STAGE FIRST LAYER

SECOND STAGE SECOND LAYER

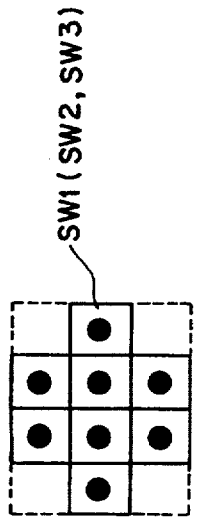
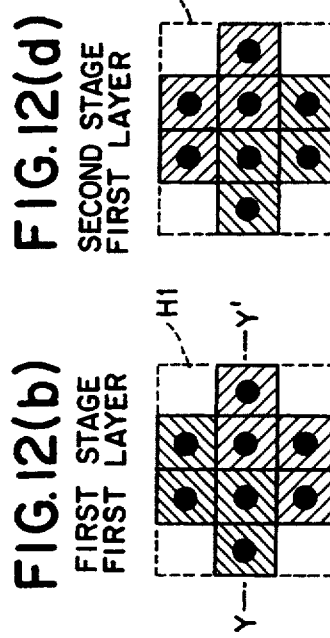
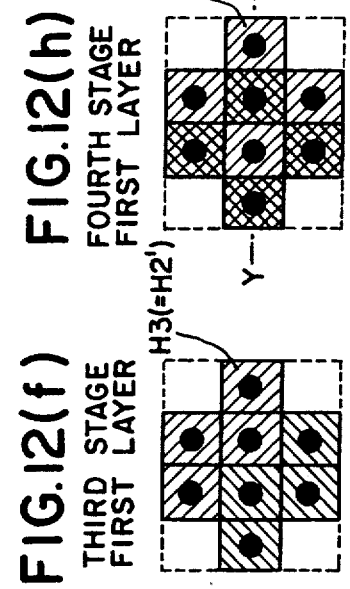
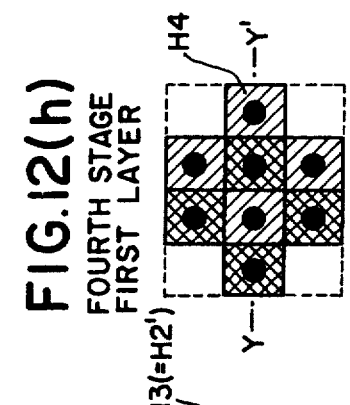
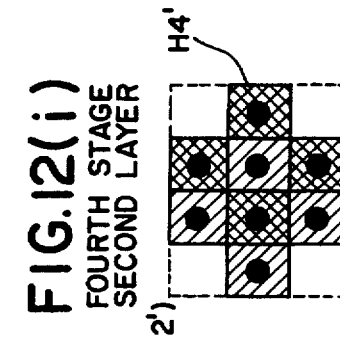
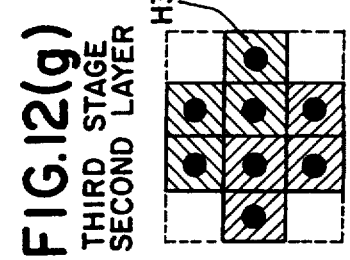
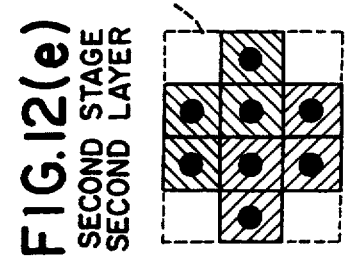
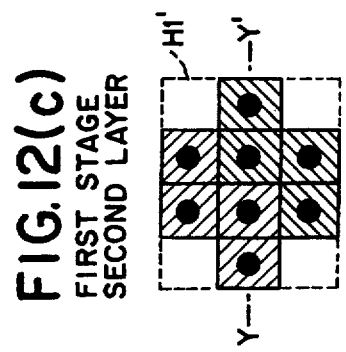

FIG.16

| 0 | 8 | 2 | 10 |
|---|---|---|---|
| 12 | 4 | 14 | 6 |
| 1 | 9 | 3 | 11 |
| 13 | 5 | 15 | 7 |

FIG.19

| 0 | 8 | 4 | 12 |
|---|---|---|----|
| 9 | 1 | 13 | 5 |
| 2 | 10 | 6 | 14 |
| 11 | 3 | 15 | 7 |

OPTICAL SPACE SWITCH EMPLOYING 2 PARALLEL DIFFRACTION GRATINGS AND A POLARIZATION ROTATING ELEMENT

BACKGROUND OF THE INVENTION

This invention relates to an optical space switch device which provides variable interconnection of one- or two-dimensionally spatially multiplexed optical signals.

In recent years, the requirement has been and is increasing for transfer of image data of a large capacity of 4 kilobytes to 6 megabytes or so by way of a very high speed transmission line of 10 gigabits/second or so. It has been proposed to employ an optical space switch device as a variably interconnectable cross connecting device to achieve such transfer.

Meanwhile, attention has been and is paid to an optical space switch device as it can be utilized also for other applications wherein a subsystem such as a coupling network between processors and/or memories of a parallel processing computer or a multistage switch for an ATM exchange is realized with optical channels.

As an optical space switch device of the type mentioned, an optical switch has conventionally been proposed and is disclosed, for example, in *APPLIED OPTICS*, Vol. 29, No. 26, pp. 3848–3854, 10 Sep., 1990, which includes a combination of a polarization controlling element formed from a liquid crystal material and a device providing a polarized light separating function and employing a hologram.

Another optical switch has been proposed and is disclosed in *Photonic Switching II*, Proceedings of the International Topical Meeting. Kobe. Japan. Apr. 12–14, 1990, which includes a combination of a polarization controlling planar element such as a liquid crystal panel for receiving a planar input and a routing element employing a birefringent crystal.

Also an optical space switch has been proposed and is disclosed in *Photonic Switching*, Vol. 8, Proceedings of the International Topical Meeting, Salt Lake City, Utah, Mar. 6–8, 1991, which includes a First reflecting block including a combination of a polarized light separator, a polarization controller, a quarter-wave (λ/4) plate and an optical path modifying element, and a second reflecting block including a quarter-wave plate and a reflecting mirror.

Also an optical crossbar switch device has been proposed wherein optical crossbar switches are disposed in a matrix on a waveguide formed on a dielectric (LiNbO$_3$) substrate.

However, such conventional optical space switch devices as described above are disadvantageous in that they are complicated in structure and expensive and require, because a polishing step is necessary, a great number of working steps.

Further, while the conventional optical space switch device of the type which includes a first reflecting block including a polarized light separator, a polarization controller, a quarter-wave plate and an optical path modifying element and a second reflecting block including a quarter-wave plate and a reflecting mirror employs a prism array as the optical path modifying element, when it is designed so as to receive multichannel beams as an input thereto, the prism array has a correspondingly great size, and besides there is the possibility that the insertion loss and the crosstalk may be increased by an increase of the number of optical paths and an increase of the difference among lengths of the optical paths by beam routes. It is further disadvantageous in that it can assume only 2-input 2-output configuration.

Also there is a disadvantage that it is impossible to handle a two-dimensional signal (planar input).

SUMMARY OF THE INVENTION

It is an object of the present invention to provide an optical space switch device which can assume a multi-input multi-output configuration readily and the insertion error and the crosstalk are minimized.

It is another object of the present invention to provide an optical space switch device wherein components are made as common as possible so that the number of different kinds of parts in production is reduced.

It is a further object of the present invention to provide an optical space switch device wherein the distance between channels is minimized.

It is a still further object of the present invention to provide an optical space switch device wherein positioning for production or assembly is facilitated.

It is a yet further object of the present invention to provide an optical space switch device which can implement, using a 2-input 2-output optical switch having polarization controlling means and optical path shifting means as a basic switch, a polarization controlling algorithm which affords non-blocking cross connect routing.

In order to attain the objects, according to one aspect of the present invention, there is provided an optical space switch device, comprising a plurality of optical space switch stages stacked to form a multi-input multi-output optical space switch, including a plurality of 2-input 2-output optical switches, each of the 2-input 2-output optical switches including polarization controlling means, disposed on two parallel optical axes, for switching a polarization plane between two orthogonal polarization directions, and optical path shifting means for outputting two beams of light along the corresponding optical axes when the polarization plane is controlled to be in one of the orthogonal polarization by the polarization controlling means and for outputting two beams of light along the other optical axes when the polarization plane is controlled to be in the other of the orthogonal polarization by the polarization controlling means, the 2-input 2-output optical switches of the optical space switch stages are disposed so as to extend planes of the parallel optical axes in parallel to each other.

The polarization controlling means comprises a pair of transparent electrodes and a liquid crystal held between the transparent electrodes such that a voltage may be applied across the liquid crystal element by the transparent electrodes to control a polarizing condition of light passing through the liquid crystal element, and the polarization controlling means is segmented in accordance with an arrangement of channels such that the segments are controlled independently of each other.

Preferably, the optical path shifting means comprises first and second diffraction grating layers disposed in a parallel and spaced relationship from each other, each of the diffraction gratings of the first and second diffraction grating layers being constituted from a pair of planar diffraction gratings having different grating vectors, the optical path shifting means being operable to shift a beam of S-polarized light by diffraction by the first and second diffraction grating layers but transmit a beam of P-polarized light through the first and second diffraction grating layers, each of the first and second diffraction grating layers being constructed such that a plurality of pairs of planar diffraction grating segments having different grating vectors in each pair are arranged two-dimensionally such that a beam of light may be shifted between adjacent channels in accordance with a polarization condition thereof.

Prefrably, the optical path shifting means comprises first and second diffraction grating layers disposed in a parallel and spaced relationship from each other, each of the diffraction gratings of the first and second diffraction grating layers being constituted from a pair of planar diffraction gratings having different grating vectors, the optical path shifting means being operable to shift a beam of S-polarized light by diffraction by the first and second diffraction grating layers but transmit a beam of P-polarized light through the first and second diffraction grating layers, each of the optical space switch stages being constituted from the polarizing controlling means and first and second diffraction grating layers stacked integrally without having an air layer therein, the optical space switch stages being stacked integrally without having an air layer therein to form the multi-input multi-output optical space switch.

The optical space switch device may further comprise collimate means provided on the light input side of the optical space switch stages for converting incident light to the optical space switch stages into parallel light, and light converging means provided on the light output side of the optical space switch stages for converging emergent light from the optical space switch stages.

According to another aspect of the present invention, there is provided an optical space switch device, comprising first and second optical space switch stages stacked in a condition rotated by 90 degrees from each other to form a 4-input 4-output optical space switch, including a pair of 2-input 2-output optical switches, each of the 2-input 2-output optical switches including polarization controlling means, disposed on two parallel optical axes, for switching a polarization plane between two orthogonal polarization directions, and optical path shifting means for outputting two beams of light along the corresponding optical axes when the polarization plane is controlled to be in one of the orthogonal polarization by the polarization controlling means and for outputting two beams of light along the other optical axes when the polarization plane is controlled to be in the other of the orthogonal polarization by the polarization controlling means, the 2-input 2-output optical switches of the first and second optical space switch stages are disposed so as to extend incident faces in parallel to each other.

According to a further aspect of the present invention, there is provided an optical space switch device, comprising four optical space switch stages stacked to form an 8-input 8-output Banyan network type optical space switch and each including four 2-input 2-output optical switches, each of the 2-input 2-output optical switches including polarization controlling means, disposed on two parallel optical axes, for switching a polarization plane between two orthogonal polarization directions, and optical path shifting means for outputting two beams of light along the corresponding optical axes when the polarization plane is controlled to be in one of the orthogonal polarization by the polarization controlling means and for outputting two beams of light along the other optical axes when the polarization plane is controlled to be in the other of the orthogonal polarization by the polarization controlling means, the 2-input 2-output optical switches of the optical space switch stages are disposed in parallel so as to extend incident faces in parallel to each other, and wherein, where the distance between most adjacent channels in a light inputting plane is represented by d and the coordinates of the origin 0 are represented by (0, 0), the channel 0 is disposed at (0, d); the channel 1 at (d, d); the channel 2 at (d, 2d); the channel 3 at (2d, 2d); the channel 4 at (d, 0); the channel 5 at (2d, 0); the channel 6 at (2d, d) ; and the channel 7 at (3d, d), and beam shifting structures between the channel 0–channel 4, the channel 1–channel 5, the channel 2–channel 6 and the channel 3–channel 7 are provided at the first optical space switch stage; beam shifting structures between the channel 0–channel 2, the channel 1–channel 3, the channel 4–channel 6 and the channel 5–channel 7 are provided at both of the second and third optical space switch stage; and beam shifting structures between the channel 0–channel 1, the channel 2–channel 3, the channel 4-channel 5 and the channel 6–channel 7 are provided at the fourth optical space switch stage.

The optical space switch device may further comprise means interposed between the third and fourth optical space switch stages for rotating a polarization plane of polarized light by 45 degrees.

According to a still futher aspect of the present invention, there is provided an optical space switch device, comprising eleven optical space switch stages stacked to provide an equivalent circuit structure of an 11 stage cross Banyan network, including a plurality of 2-input 2-output optical switches, each of the 2-input 2-output optical switches including polarization controlling means, disposed on two parallel optical axes, for switching a polarization plane between two orthogonal polarization directions, and optical path shifting means for outputting two beams of light along the corresponding optical axes when the polarization plane is controlled to be in one of the orthogonal polarization by the polarization controlling means and for outputting two beams of light along the other optical axes when the polarization plane is controlled to be in the other of the orthogonal polarization by the polarization controlling means, the 2-input 2-output optical switches of the optical space switch stages are disposed so as to extend planes provided by the parallel optical axes in parallel to each other, and wherein, where the distance between most adjacent channels in a light inputting plane is represented by d and the coordinates of the origin 0 are represented by (0, 0), the channel 0 is disposed at (0, 0); the channel 1 at (0, −2d); the channel 2 at (2d, 0); the channel 3 at (2d, −2d); the channel 4 at (d, −d) ; the channel 5 at (d, −3d); the channel 6 at (3d, −d); the channel 7 at (3d, −3d); the channel 8 at (d, 0); the channel 9 at (d, −2d); the channel 10 at (3d, 0); the channel 11 at (3d, −2d); the channel 12 at (0, −d); the channel 13 at (0, −3d); the channel 14 at (2d, −d); and the channel 15 at (2d, −3d), and a beam can be shifted between the channels 0–2, 4–6, 1–3, 5–7, 8–10, 12–14, 9–11 and 13–15 at the first, fourth, seventh and tenth optical space switch stages; a beam can be shifted between the channels 0–1, 4–5, 2–3, 6–7, 12–13, 8–9, 14–15 and 10–11 at the second, fifth, eighth and eleventh optical space switch stages; a beam can be shifted between the channels 0–4, 1–5, 2–6, 3–7, 8–12, 9–13, 10–14 and 11–15 at the third and ninth optical space switch stages; and a beam can be shifted between the channels 0–8, 12–4, 1–9, 13–5, 2–10, 14–6, 3–11 and 15–7 at the sixth optical space switch stage; and where NB(I) is the Ith bit of the binary represented address of each node at each stage, FB(J) is the Jth bit of the binary represented address of a destination node, PS is the polarization of the input beam at each node having the value "0" when the polarization of the input beam to the node is P-polarization but having the value "1" when such polarization is S-polarization, and SC is the state of the polarization controlling switch, polarization switch setting is provided such that, for the first, fourth, seventh and tenth stages,

SC=PS XOR (NB(3) XOR FB(3))

for the second, fifth, eighth and eleventh stages,

SC=PS XOR (NB(4) XOR FB(4))

for the third and ninth stages,

SC=PS XOR (NB(2) XOR FB(2)), and for the sixth stage,

SC=PS XOR (NB(1) XOR FB(1))

where X XOR Y signifies exclusive OR of X and Y.

According to a yet further aspect of the present invention, there is provided an optical space switch device, comprising nine optical space switch stages stacked to provide an equivalent circuit structure of a 9 stage expanded modified Banyan network, including a plurality of 2-input 2-output optical switches, each of the 2-input 2-output optical switches including polarization controlling means, disposed on two parallel optical axes, for switching a polarization plane between two orthogonal polarization directions, and optical path shifting means for outputting two beams of light along the corresponding optical axes when the polarization plane is controlled to be in one of the orthogonal polarization by the polarization controlling means and for outputting two beams of light along the other optical axes when the polarization plane is controlled to be in the other of the orthogonal polarization by the polarization controlling means, the 2-input 2-output optical switches of the optical space switch stages are disposed so as to extend planes provided by the parallel optical axes in parallel to each other: and wherein, where the distance between most adjacent channels in a light inputting plane is represented by d and the coordinates of the origin 0 are represented by (0, 0), the channel 0 is disposed at (0, 0); the channel 1 at (d, −d); the channel 2 at (0, −2d); the channel 3 at (d, −3d); the channel 4 at (2d, 0); the channel 5 at (3d, −d); the channel 6 at (2d, −2d); the channel 7 at (3d, −3d); the channel 8 at (d, 0); the channel 9 at (0, −d); the channel 10 at (d, −2d); the channel 11 at (0, −3d); the channel 12 at (3d, 0); the channel 13 at (2d, −d); the channel 14 at (3d, −2d); and the channel 15 at (2d, −3d), and a beam can be shifted between the channels 0–4, 1–5, 2–6, 3–7, 8–12, 9–13, 10–14 and 11–15 at the first and sixth optical space switch stages; a beam can be shifted between the channels 0–2, 1–3, 4–6, 5–7, 9–11, 8–10, 13–15 and 12–14 at the second, third, seventh and eighth optical space switch stages; a beam can be shifted between the channels 0–1, 2–3, 4–5, 6–7, 8–9, 10–11, 12–13 and 14–15 at the fourth and ninth optical space switch stages; and a beam can be shifted between the channels 0–8, 1–9, 2–10, 3–11, 4–12, 5–13, 6–14 and 7–15 at the fifth optical space switch stage; and where NB(I) is the Ith bit of the binary represented address of each node at each stage, FB(J) is the Jth bit of the binary represented address of a destination node, PS is the polarization of the input beam at each node having the value "0" when the polarization of the input beam to the node is P-polarization but having the value "1" when such polarization is S-polarization, and SC is the state of the polarization controlling switch, polarization switch setting is provided such that, for the first, third, fourth, sixth, eighth and ninth stages,

SC=PS XOR (NB(M) XOR FB(M))

where M=2, 3, 4, 2, 3, 4 in this order for the stages, for the second and seventh stages, SC=PS XOR (NB(3) XOR FB(3)), and for the fifth stage,

SC=PS XOR (NB(1) XOR FB(1))

where X XOR Y signifies exclusive OR of X and Y.

According to a yet further aspect of the present invention, there is provided an optical space switch device, comprising a plurality of optical space switch stages stacked to provide an equivalent circuit structure of an 8-input modified Banyan network wherein four such optical space switch stages are stacked, the optical space switch device having an equivalent circuit structure of a $2^n$-input expanded modified Banyan network formed by expanding the 8-input modified Banyan network by combination of a plurality of such 8-input modified Banyan networks, each of the optical space switch stages including a plurality of 2-input 2-output optical switches, each of the 2-input 2-output optical switches including polarization controlling means, disposed on two parallel optical axes, for switching a polarization plane between two orthogonal polarization directions, and optical path shifting means for outputting two beams of light along the corresponding optical axes when the polarization plane is controlled to be in one of the orthogonal polarization by the polarization controlling means and for outputting two beams of light along the other optical axes when the polarization plane is controlled to be in the other of the orthogonal polarization by the polarization controlling means, the 2-input 2-output optical switches of the optical space switch stages are disposed so as to extend planes provided by the parallel optical axes in parallel to each other; and wherein, in each of the 8-input modified Banyan networks, where NB(I) is the Ith bit of the binary represented address of each node at each stage, FB(J) is the Jth bit of the binary represented address of a destination node, PS is the polarization of the input beam at each node having the value "0" when the polarization of the input beam to the node is P-polarization but having the value "1" when such polarization is S-polarization, and SC is the state of the polarization controlling switch, polarization switch setting is provided such that, for the first, third and fourth stages,

SC=PS XOR (NB(M) XOR FB(M))

where M=1, 2, 3 in this order for the stages, and for the second stage,

SC=PS XOR FB(2)

where X XOR Y signifies exclusive OR of X and Y.

Preferably, the number of inputs is given by $2^{N+2}$, N being a positive integral number, and, when N is an odd number, a second arrangement which is horizontally symmetrical with an original arrangement of $2^{N+2}$ channels is first made separately, and then channel numbers equal to or greater than $2^{N+2}$ are applied to the second channel arrangement while maintaining the order of rows and the order of columns in each row of the original channel arrangement, whereafter the two channel arrangements are overlaid to make a further arrangement of $2^{N+3}$ channels, thereby expanding the 8-input modified Banyan network by combination of a plurality of such 8-input modified Banyan networks.

Preferably, the number of inputs is given by $2^{N+2}$, N being a positive integral number, and, when N is an even number, a second arrangement which is the same as an original arrangement of $2^{N+2}$ channels is made separately, and then channel numbers equal to or greater than $2^{N+2}$ are applied to the second channel arrangement while maintaining the order of rows and the order of columns in each row of the original channel arrangement, whereafter the two channel arrangements are overlaid in a displaced condition by one half the minimum channel distance d in two orthogonal directions to make a further arrangement of $2^{N+3}$ channels, thereby expanding the 8-input modified Banyan network by combination of a plurality of such 8-input modified Banyan networks.

According to a yet further aspect of the present invention, there is provided an optical space switch device, comprising a 2-input 2-output optical switch including polarization controlling means, disposed on two parallel optical axes, for switching a polarization plane between two orthogonal polarization directions, and optical path shifting means for outputting two beams of light along the corresponding optical axes when the polarization plane is controlled to be in one of the orthogonal polarization by the polarization controlling means and for outputting two beams of light along the other optical axes when the polarization plane is controlled to be in the other of the orthogonal polarization by the polarization controlling means.

Preferably, the optical path shifting means comprises first and second diffraction grating layers disposed in a parallel and spaced relationship from each other, each of the diffraction gratings of the first and second diffraction grating layers being constituted from a pair of planar diffraction gratings having different grating vectors, the optical path shifting means being operable to shift a beam of S-polarized light by diffraction by the first and second diffraction grating layers but transmit a beam of P-polarized light through the first and second diffraction grating layers.

The diffraction grating of each of the diffraction grating layers has grating stripes inclined in a thicknesswise direction so that a flux of light incident perpendicularly thereto may be deflected by a required angle by Bragg diffraction.

Preferably, the diffraction grating of each of the diffraction grating layers has an asymmetrical cross section so that a flux of light incident perpendicularly thereto may be deflected by a required angle by Bragg diffraction. The angle at which the diffraction grating of each of the diffraction grating layers deflects a flux of light incident perpendicularly thereto by Bragg may be set to 48.2 degrees. Preferably, the diffraction grating of each of the diffraction grating layers is constructed such that the diffraction factor modulation $\Delta n$, wavelength $\lambda$ and thickness D thereof may satisfy the equation $\Delta n \cdot D \cdot \cos 48.2° = \pi \cdot \lambda$.

Preferably, a holographic diffraction grating is employed for the diffraction grating layers.

The polarization controlling means may comprise a pair of transparent electrodes and a liquid crystal held between the transparent electrodes such that a voltage may be applied across the liquid crystal element by the transparent electrodes to control a polarizing condition of the liquid crystal element, and the diffraction grating layers are formed integrally on a substrate on which the transparent electrodes are formed with the liquid crystal element held therebetween.

Preferably, each of the first and second diffraction grating layers is constructed such that adjacent regions of the diffraction grating having an equal spatial frequency and having grating vectors of a same direction are joined together to eliminate a boundary therebetween.

Preferably, each of the first and second diffraction grating layers is constructed such that all channels are surrounded by a boundary having a predetermined width in which no diffraction grating is formed.

Preferably, the first diffraction grating layer is formed integrally on a face of a transparent flat plate and the second diffraction grating layer is formed integrally on the other face of the transparent flat plate.

With the optical space switch devices, since it comprises a plurality of optical space switch stages stacked to construct a multi-input multi-output optical space switch and:each comprising a plurality of 2-input 2-output optical switches having a bypass mode and an exchange mode and disposed such that planes of respective two parallel optical axes thereof may extend in parallel to each other and particularly the optical path modifying portion of each optical space switch can be formed in a stacked Structure of a polarization controlling element and diffraction gratings, it is simple in construction and can be constructed suitably for two-dimensionally arranged channels.

Further, while each of the diffraction grating layers constituting the optical space switch stages has a plurality of segments, most of them are common although they are different in direction or front-back orientation, and advantageously the number of different types of parts is not so much as the number of diffraction grating layers involved.

Further, since modification of optical paths at each stage takes place between adjacent channels, the lengths of the optical paths required therefor are minimized and it is possible to reduce the distance between channels.

Further, where the diffracting grating layers are provided integrally on the opposite faces of the transparent flat plate, positioning of the optical switch can be performed readily upon production or assembly.

Besides, a small size multi-input multi-output optical space switch device of the thin layer stacked structure can be constructed readily by combination of a polarization controlling element and hologram diffraction elements thereby to optically realize non-blocking cross connect routing of a non-Banyan network (including an expanded modified Banyan network) which is reduced in insertion loss and crosstalk.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIGS. 12(a) to 12(i) are schematic illustrations showing component elements at the different stages of the 8-input 8-output optical space switch device of FIG. 10;

FIG. 16 is a diagrammatic representation illustrating a two-dimensional arrangement of input beams to the 11 stage 16×16 cross connect switch of the fourth preferred embodiment;

FIG. 19 is a diagrammatic representation illustrating a two-dimensional arrangement of input beams to the 9 stage 16×16 cross connect switch of the fifth preferred embodiment of the present invention;

Figure 1A:
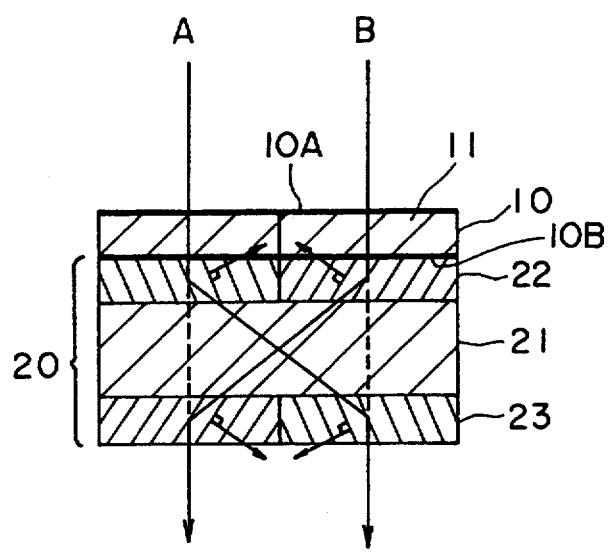
FIG. 1(a) is a schematic view showing construction of a 2-input 2-output optical switch device according to a first preferred embodiment of the present invention.

DESCRIPTION OF THE PREFERRED EMBODIMENTS (a) Description of the First Embodiment Referring first to FIG. 1(a), there is shown a 2-input 2-output optical switch as a unit switch of an optical space switch device of the present invention. The 2-input 2-output optical switch shown includes polarization controlling means 10 disposed in two parallel optical axes (one of which will be hereinafter referred to as channel A and the other as channel B) for switching a linear polarization plane between conditions of two orthogonal directions, and optical path shifting means 20 also disposed in the two parallel optical axes for shifting optical paths by diffraction so that a flux of light propagating along any one of the optical axes may propagate, after it passes the optical path shifting means 20, along the other optical axis when the light is in one of the conditions of the two polarization directions.

Here, though not particularly shown, the polarization controlling means 10 is constructed as means wherein liquid crystal is held between a pair of transparent, electrodes 10A and 10B such that a voltage may be applied thereacross from the latter so that it may control a condition of light to be polarized thereby.

Meanwhile, the optical path shifting means 20 includes a first diffraction grating layer 22 and a second diffraction grating layer 23 disposed in a parallel and spaced relationship from each other with a transparent flat plate 21, such as a glass plate, interposed therebetween. The diffraction grating of each of the first and second diffraction grating layers 22 and 23 is composed of a pair of plane diffraction gratings having different grating vectors. When a beam of S-polarized light is introduced into the optical path shifting means 20, it is diffracted first by the first diffraction grating layer 22 and then by the second diffraction grating layer 23 so that it is shifted from the channel A to the channel B or vice versa, but when a beam of P-polarized light is introduced into the optical path shifting means 20, it passes through both of the first and second diffraction grating layers 22 and 23. A diffraction grating layer which employs a holographic diffraction grating is used for each of the diffraction grating layers 22 and 23.

It is to be noted that, in this instance, the optical path shifting means 20 is constructed such that grating stripes of the diffraction grating layers 22 and 23 are inclined in a thicknesswise direction so that the diffraction gratings may deflect a flux of light incident perpendicularly thereto by a predetermined angle by Bragg diffraction.

Figure 2:
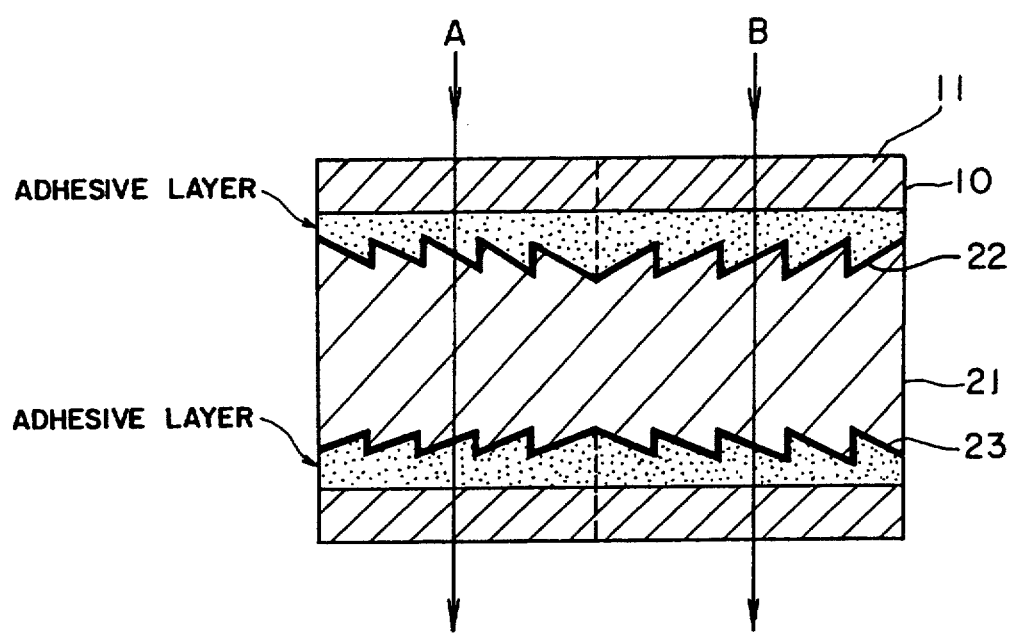
FIG. 2 is a schematic view showing construction of a modification to the 2-input 2-output optical switch device of FIG. 1(a)

However, each of the diffraction grating layers 22 and 23 may otherwise be constructed such that, as shown in FIG. 2, the cross section of the grating thereof has an assymmetrical shape such that the diffraction grating may deflect a flux of light incident perpendicularly thereto by a predetermined angle by Bragg diffraction.

In the modified 2-input 2-output optical switch shown in FIG. 2, the diffraction grating layer 22 is formed integrally on a substrate 11 wherein a pair of transparent electrodes are formed on the opposite faces of a liquid crystal. This facilitates production of the optical switch.

Further, the first diffraction grating layer 22 may be provided integrally on one face of the transparent flat plate 21 while the second diffraction grating layer 23 is provided integrally on the opposite face of the transparent flat plate 21. This facilitates accurate positioning of the optical switch upon assembly.

It is to be noted that, in FIGS. 1(a) and 2, the diffraction grating layers 22 and 23 are shown with a greater thickness than an actual one in order to clearly indicate presence of them, but the ratios in thickness among the substrate 11, transparent flat plate 21 and diffraction grating layers 22 and 23 are not such as seen from FIG. 1(a) or 2.

In this manner, with either of the 2-input 2-output optical switches shown in FIGS. 1(a) and 2, optical paths can be exchanged between the two parallel channels A and B. In particular, when two beams of linearly polarized light are introduced from the channels A and B into the 2-input 2-output optical switch, switching whether the beams advance straightforwardly without exchanging the optical paths thereof (bypass mode) or advance exchanging the optical paths thereof (exchange mode) can be performed depending upon whether the light has a polarization plane parallel to the plane of FIG. 1(a) or 2 (P-polarized light) or has another polarization plane perpendicular to the plane of FIG. 1(a) or 2 (S-polarized light).

Then, in order to positively change the polarization condition from S to P or reversely from P to S, the polarization controlling means 10 described above is used, and in order to diffract a beam of light in accordance with a polarization condition, the first and second diffraction grating layers 22 and 23 are used.

Further, optical channels parallel to each other and a construction wherein planar means are stacked perpendicular to the optical axes make it possible to achieve, using the stack as a unit, a structure wherein a plurality of such units are arranged two-dimensionally and in parallel. Further, structure constructed in the manner can be placed one on another into a plurality of stages in the direction of the optical axes, which is advantageous in constructing a multichannel switch.

It is to be noted that, while a holographic diffraction grating is employed for the first and second diffraction grating layers 22 and 23 as described above, a plane grating composed of parallel stripes is used as the diffraction grating such that it diffracts light incident perpendicularly thereto toward the other channel.

In this instance, the stripes in a cross section of the diffraction grating are inclined as described above in order to achieve efficient Bragg diffraction of light. Further, since the diffracted directions of light are different between the channels A and B, the slanting directions of the grating stripes are changed symmetrically in the two different regions. In other words, the slating directions are symmetrical with respect to a boundary plane between the channels.

Further, the holographic diffraction gratings are produced in special conditions in order that they may act on S-polarized light so that it may be diffracted but they may not act on P-polarized light so that it may pass therethrough. The conditions will be hereinafter, described.

Figure 1B:
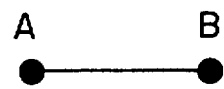
FIG. 1(b) is a diagrammatic view illustrating a manner of representing an abbreviation mark of the 2-input 2-output optical switch device of FIG. 1(a)

It is to be noted that, ion the convenience of description below, a manner wherein the construction of FIG. 1(a) is viewed in the incoming direction of light is represented in an abbreviated symbol wherein two dank dots are interconnected by a line as shown in FIG. 1(b). Each dank dot indicates a channel, and a line segment indicates that optical paths can be exchanged between channels at the opposite ends thereof.

Figure 4:
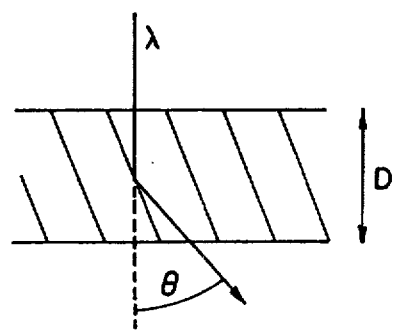
FIG. 4 is a schematic sectional view of a holographic diffraction grating.

In addition, from the coupled wave theory, approximate expressions of a diffraction efficiency are represented in the following manner for S- and P-polarized light, respectively:

$$\pi s = \sin^2[(\pi \Delta n D)/\lambda \cos\tfrac{1}{2}\theta)] \quad (1)$$

$$\pi p = \sin^2[(\pi \Delta n D \cos\tfrac{1}{2}\theta)/\lambda] \quad (2)$$

where $\Delta n$ is a refractive index modulation, D is a thickness of a hologram medium, $\lambda$ is a wavelength of light, and $\theta$ is a diffraction angle (refer to FIG. 4).

As can be seen from the expressions (1) and (2), both of the approximate expressions are functions of $\sin^2$, but are different in period.

Figure 3:
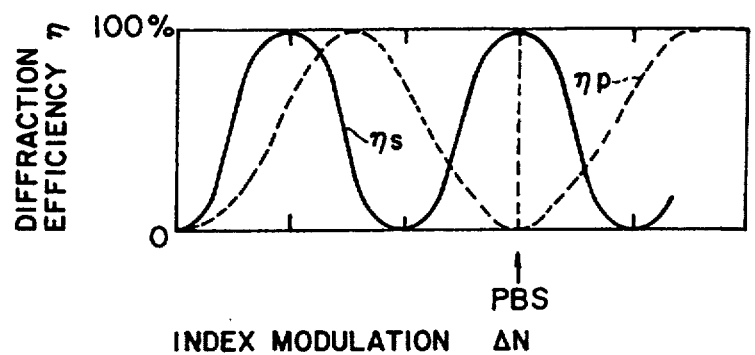
FIG. 3 is a diagram showing an efficiency characteristic of a holographic diffraction grating.

In order to realize a polarizing beam splitter (PBS) function which diffracts S-polarized light by almost 100% but transmits almost all of P-polarized light therethrough using a holographic diffraction grating, conditions of a hologram are determined such that, as shown in FIG. 3 (which is a diagram showing a relationship between a diffraction efficiency and a refractive index modulation of a volume type holographic diffraction grating), the second peak at which the efficiency ion S-polarized light presents its maximum and the bottom at which the efficiency ion P-polarized light presents its minimum may coincide with each other.

$$(\pi \Delta n D)/(\lambda \cos\tfrac{1}{2}\theta) = (3/2)\pi \quad (3)$$

$$(\pi \Delta n D \cos\tfrac{1}{2}\theta)/\lambda = \pi \quad (4)$$

Now, if the equation (4) is divided by the equation (3), then $\cos\theta = \tfrac{2}{3}$ is obtained, and accordingly, $\theta = 48.2$ degrees. Further, a combination of D and $\Delta n$ is selected such that both of the equations (3) and (4) may be satisfied. For example, if $D = 15$ $\mu$m, then $\Delta n = 0.069$ should be realized.

Figure 5:
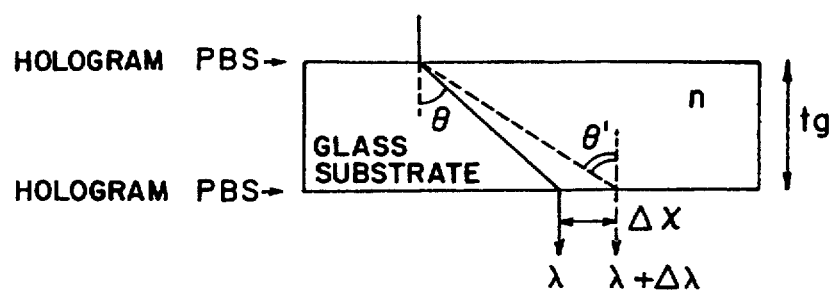
FIG. 5 is a diagrammatic view illustrating a shift of a beam caused by a variation of the wavelength.

FIG. 5 illustrates a beam shifting phenomenon when the wavelength of light varies. When a semiconductor laser is employed as a light source, it must be taken into consideration that the wavelength is varied by a temperature, a driving current, a difference among individual elements and so forth.

Now, if light takes an optical path indicated by a solid line when the wavelength thereof is $\lambda$, then when the wavelength is $\lambda + \Delta\lambda$ ($\Delta\lambda > 0$), the diffraction angle increases from $\theta$ to $\theta'$ so that the optical path changes to such as indicated by a broken line. Diffraction by 2 hologram layers proved that a beam is shifted by $\Delta x$ parallelly, but does not change its propagating direction.

Then, the shift amount $\Delta x$ of the beam is $\Delta x = 40$ $\mu$m at $\Delta\lambda = 10$ nm when the distance tg between the two hologram layers is tg=1 mm and, in addition, $\theta = 48.2$ degrees and n=1.6. Further, in the case of $\Delta\lambda < 0$, the shift of the beam occurs in the opposite direction ($\Delta x < 0$). However, such beam shift as caused by a variation in wavelength described above does not make a practical problem where the distance between channels is sufficiently large.

(b) Description of the Second Embodiment

Figure 6:
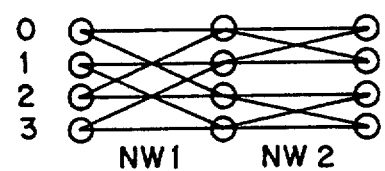
FIG. 6 is a diagrammatic view illustrating wiring between channels of a 4-input 4-output optical space switch device as a second preferred embodiment of the present invention.

FIG. 6 shows a wiring scheme of a 4-input 4-output (4×4) cross connect switch. In FIG. 6, four channels are denoted at 0, 1, 2 and 3. The 4-input 4-output cross connect switch has two stages of wiring structure.

In particular, in the 4-input 4-output cross connect switch, a 4-input 4-output optical space switch is constructed such that a first optical space switch stage NW1 (which may be hereinafter referred to merely as first stage NW1) and a second optical space switch stage NW2 (which may be hereinafter referred to merely as second stage NW2) each composed of two 2-input 2-output optical switches shown in FIG. 1(a) or 2 disposed in parallel to each other such that incidence faces thereof may extend in parallel to each other and the stages are stacked in a condition wherein they are rotated by 90 degrees from each other.

Figures 7A, 7B:
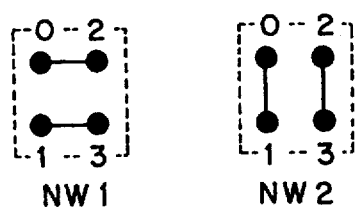
FIGS. 7(a) and 7(b) are diagrammatic views illustrating wiring schemes at different stages of the 4-input 4-output optical space switch device of FIG. 6.

More particularly, the 4-input 4-output optical space switch may be constructed in such a manner as shown in FIGS. 7(a) and 7(b), respectively. In particular, at the first stage NW1, optical paths can be switched between the channels 0-2 and 1-3, and at the second stage NW2, optical paths can be switched between the channels 0-1 and 2-3. The wiring scheme shown in FIG. 6 can be realized in this manner.

Consequently, the 4-input 4-output optical space switch is constructed wherein a shift of a beam based on a polarization condition is performed only between adjacent channels.

Each stage section is constructed by stacking such elements as shown in FIGS. 8(a) to 8(f). It is to be noted that all of FIGS. 8(a) to 8(f) are schematic views as viewed in the incoming direction of a beam.

Figure 8A:
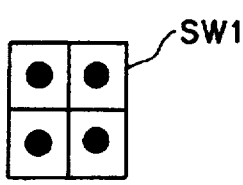
FIGS. 8(a) to 8(f) are schematic illustrations showing components at the different stages of the 4-input 4-output optical space switch device of FIG. 6.

First, FIG. 8(a) shows a polarization controlling element SW1 for controlling polarization conditions of beams propagating along four channels independently of one another. The polarization controlling element SW1 is constructed such that, as described hereinabove in connection with the 2-input 2-output switch, for example, a liquid crystal element is held between a pair of transparent electrodes and a voltage is applied across the liquid crystal element to rotate polarized light by 90 degrees. Such transparent electrodes are provided for each channel and controlled independently of one another. In other words, the polarization controlling means is segmented in accordance with an arrangement of channels and formed integrally with one another such that the segments may be controlled independently of one another.

Figure 8B:
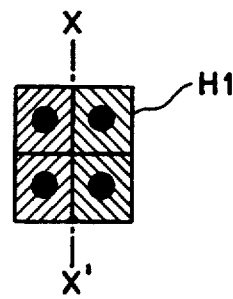

FIG. 8(b) shows a first diffraction grating layer H1. While the first diffraction grating layer H1 is shown divisionally in four segments, actually it is composed of two kinds of gratings. This signifies that no boundary is required between the grating for the channels 0 and 1 and the grating for the channels 2 and 3. It is to be noted that segments shown in a same figure (slanting lines) represents that they have holographic diffraction gratings having a same grating vector.

Figure 8C:
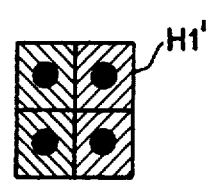

FIG. 8(c) shows a second diffraction grating layer H1'. The second diffraction grating layer H1' has a structure obtained by turning over the first diffraction grating layer H1 around the axis X-X' in FIG. 8(b). Also in this instance, no boundary may be provided between the grating for the channels 0 and 1 and the grating for the channels 2 and 3.

In other words, in the present arrangement, the first diffraction grating layer H1 and the second diffraction grating layer H' are constructed such that a boundary is eliminated by connecting regions of adjacent diffraction gratings which have an equal spatial frequency and are same in direction of a grating vector.

The first stage NW1 thus has a stacking structure of the polarization controlling element SW1, first diffraction grating layer H1 and second diffraction grating layer H1' described above with reference to FIGS. 8(a) to 8(c), respectively.

Figure 8D:
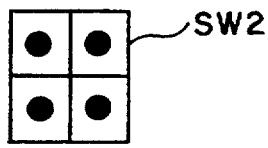
Figure 8E:
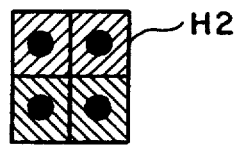
Figure 8F:
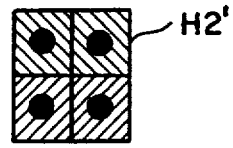

Meanwhile, the second stage NW2 is constructed by stacking such elements as shown in FIGS. 8(d) to 8(f). In particular, FIG. 8(d) shows a polarization controlling element SW2 similar to the polarization controlling element SW1 shown in FIG. 8(a). FIGS. 8(e) and 8(f) show diffraction grating layers similar to those of FIGS. 8(b) and 8(c), respectively. However, the first diffraction grating layer H2 of FIG. 8(e) has a structure obtained by rotating the first diffraction grating layer H1 of FIG. 8(b) by 90 degrees in its plane, and the second diffraction grating layer H2' of FIG. 8(f) has a structure obtained by rotating the second diffraction grating layer H1' of FIG. 8(c) by 90 degrees in its plane.

The second stage NW2 thus has a stacking structure of the polarization controlling element SW2, first diffraction grating layer H2 and second diffraction grating layer H2' described above with reference to FIGS. 8(d) to 8(f), respectively.

Accordingly, it can be seen from the foregoing that each of the first diffraction grating layer H1 (H2) and the second diffraction grating layer H1' (H2') is constructed such that two pairs of planar diffraction grating segments having different grating vectors are disposed two-dimensionally.

Figure 9:
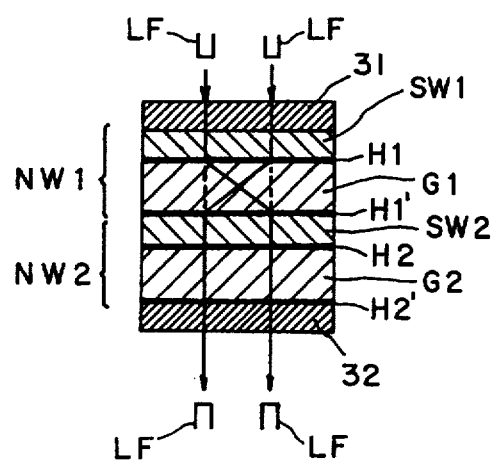
FIG. 9 is a schematic view showing a stacking structure of the 4-input 4-output optical space switch device of FIG. 6.

FIG. 9 schematically shows the 4×4 optical switch constructed by stacking such two stage structures. In the arrangement shown, a microlens array (collimate means) 31 for collimating light emerging from four optical fibers LF is provided on the input side of the 4-input 4-output optical space switch including the first optical space switch stage NW1 and the second optical space switch stage NW2 described above, and another microlens array (light converging means) 32 for converging and introducing four light beams into four different optical fibers LF is provided on the output side of the 4-input 4-output optical space switch. It is to be noted that reference characters G1 and G2 in FIG. 9 denote each a transparent flat plate.

In this manner, the 4-input 4-output optical space switch is constructed such that two optical space switch stages each including polarization controlling means and first and second diffraction grating layers stacked integrally with each other without having an air layer therein are stacked integrally with each other without having an air layer therein.

In this manner, a multistage optical cross connect switch of the two-dimensional channel arrangement can be realized by stacking a plurality 0f stage structures for shifting optical paths in different directions each including a two-dimensional combination of unit structures in each of which a polarization condition of light is controlled by means for switching a linear polarization plane of light between conditions of two orthogonal directions and a pair of diffraction grating layers to shift optical paths. Further, since an optical path modifying section of the optical space switch has a stacking structure of a polarization controlling element and diffraction gratings, it is simple in construction and is suitable for two-dimensionally arranged channels. While each of diffraction grating layers constituting the stages has a plurality of segments, most of them are common while they are different in direction or front-rear orientation and advantageously the number of different types of parts is not so much as the number of involved diffraction grating layers. Further, since modification of optical paths at each stage takes place between adjacent channels, the lengths of the optical paths required therefor are minimized and it is possible to reduce the distance between channels.

It is to be noted that, while the planar elements are stacked, for example, by alternately adhering liquid crystal polarization controlling elements and transparent flat plates, which each has first and second diffraction grating layers on the opposite faces thereof, they may be stacked in any other suitable manner by any other suitable means.

(c) Description of the Third Embodiment

Figure 10:
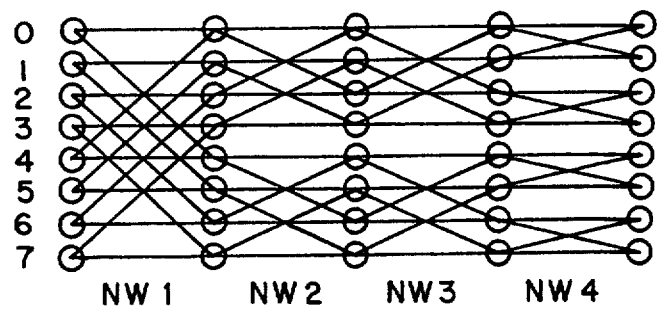
FIG. 10 is a diagrammatic view illustrating wiring between channels of an 8-input 8-output optical space switch device as a third preferred embodiment of the present invention.

FIG. 10 shows a wiring scheme of an 8-input 8-output (8×8) cross connect switch. In FIG. 10, eight channels are individually denoted by reference numerals 0 to 7. The wiring scheme has four stages.

Figures 11A, 11B:
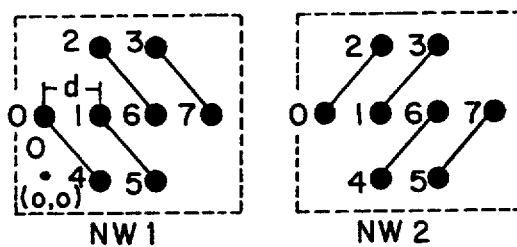
FIGS. 11(a) to 11(d) are diagrammatic views illustrating wiring schemes at different stages of the 8-input 8-output optical space switch device of FIG. 10.
Figures 11C, 11D:
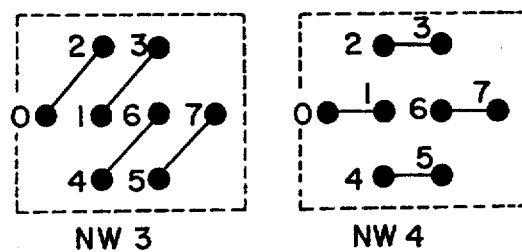

In particular, in the present arrangement, each of first to fourth optical space switch stages NW1 to NW4 has a structure wherein four such 2-input 2-output optical switches as shown in FIG. 1(a) or 2 are arranged in parallel to each other. More particularly, when the first adjacent channel distance is represented by d and the coordinates of the origin 0 are represented by (0, 0) as shown in FIG. 11(a), the channel 0 is disposed at (0, d); the channel 1 at (d, d); the channel 2 at (d, 2d); the channel 3 at (2d, 2d); the channel 4 at (d, 0); the channel 5 at (2d, 0); the channel 6 at (2d, d); and the channel 7 at (3d, d), and at the first optical space switch stage (first stage) NW1, beam shifting structures between the channel 0–channel 4, the channel 1–channel 5, the channel 2–channel 6 and the channel 3–channel 7 as shown in FIG. 11(a) are provided: beam shifting structures between the channel 0–channel 2, the channel 1–channel 3, the channel 4–channel 6 and the channel 5–channel 7 are provided at both of the second optical space switch stage (second stage) NW2 and the third optical space switch stage (third stage) NW3 as shown in FIGS. 11(b) and 11(c); and beam shifting structures between the channel 0–channel 1, the channel 2–channel 3, the channel 4–channel, 5 and the channel 6–channel 7 are provided at the fourth optical space switch stage (fourth stage) NW4 as shown in FIG. 11(d), thereby constituting the 8-input 8-output Banyan network type optical space switch.

Thus, an 8-input 8-output optical space switch is constructed wherein shifting of beams based on a polarization condition is performed only between most adjacent channels and second most adjacent channels.

It is to be noted that, while it can be seen from the foregoing that the second stage NW2 and the third stage NW3 have the same wiring scheme, this is intended to produce a bypass for preventing otherwise possible blocking.

Each of the stages is constructed by stacking such elements as shown in FIGS. 12(a) to 12(i), each of which is a schematic view as viewed in the incoming direction of a beam.

FIG. 12(a) shows a polarization controlling element SW1 for controlling polarization conditions of beams propagating along four channels independently of each other. In this instance, the number of segments is 8, but the structure of the polarization controlling element SW1 is similar to that described hereinabove in connection with the 4×4 switch. In particular, the polarization controlling means is segmented in accordance with an arrangement of the channels and the segments are formed integrally such that they may be controlled independently of one another.

FIG. 12(b) shows a first diffraction grating layer H1. In this instance, while the first diffraction grating layer H1 is shown divisionally in eight segments, actually it is composed of two kinds of gratings. Further, no boundary is required between the grating for the channels 0, 1, 2 and 3 and the grating for the channels 4, 5, 6 and 7. It is to be noted that, also in this instance, segments shown in a same figure (slanting lines) represents holographic diffraction gratings having a same grating vector.

FIG. 12(c) shows a second diffraction grating layer H1'. Also in this instance, no boundary is required between the grating for the channels 0, 1, 2 and 3 and the grating for the channels 4, 5, 6 and 7.

In particular, each of the first diffraction grating layer H1 and the second diffraction grating layer H1' is constructed such that a boundary is eliminated by interconnecting regions of adjacent diffraction gratings which have an equal spatial frequency and are same in direction of a grating vector.

The first stage NW1 thus has a stacking structure of the polarization controlling element SW1, first diffraction grating layer H1 and second diffraction grating layer H1' described above with reference to FIGS. 12(a) to 12(c), respectively.

Meanwhile, the second stage NW2 is constructed by stacking such elements SW2, H2 and H2' as shown in FIGS. 12(a), 12(d) and 12(e), respectively. The third stage NW3 is constructed by stacking such elements SW3, H3 and H3' as shown in FIGS. 12(a), 12(f) and 12(g), respectively.

In this instance, the elements shown in FIGS. 12(d) and 12(f) and the elements shown in FIGS. 12(e) and 12(g) are similar diffraction grating layers and have structures obtained by turning over the elements shown in FIGS. 12(c) and 12(b) around the axis Y–Y', respectively.

A half-wave plate for rotating a polarization plane of light by 45 degrees is interposed between the third stage NW3 and the fourth stage NW4.

Further, the fourth stage NW4 is constructed by stacking such elements SW4, H4 and H4' shown in FIGS. 12(a), 12(h) and 12(i), respectively. The element H4' shown in FIG. 12(i) has a structure obtained by turning over the element H4 shown in FIG. 12(h) around the axis Y–Y'.

While the 8-input 8-output optical space switch has a total of 8 holographic diffraction grating layers shown in FIGS. 12(b) to 12(i), it involves only three patterns shown in FIGS. 12(b), 12(c) and 12(h).

Accordingly, each of the first diffraction grating layer H1 (H2, H3 or H4) and the second diffraction grating layer H1' (H2', H3' or H4') is constructed such that four pairs of planar diffraction grating segments having different grating vectors are arranged two-dimensionally.

Figure 13:
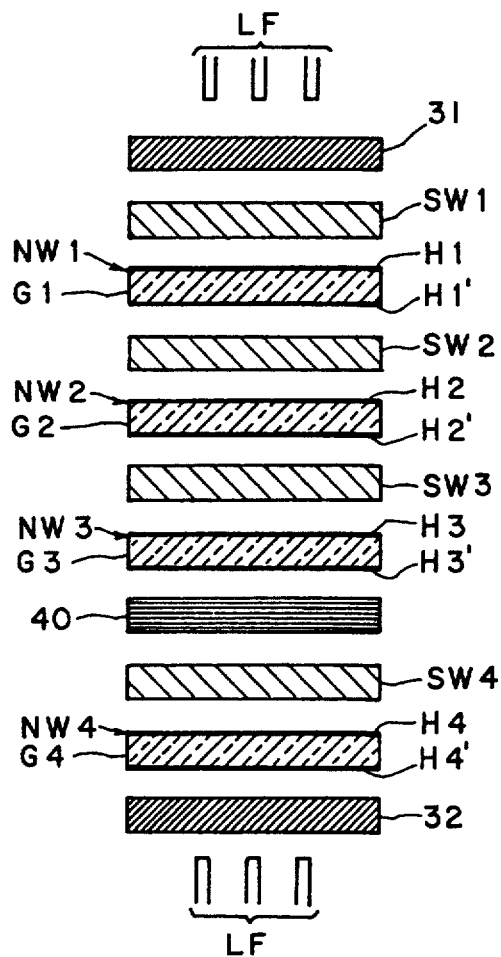
FIG. 13 is a schematic view showing a stacking structure of the 8-input 8-output optical space switch device of FIG. 10.

FIG. 13 schematically shows the 8×8 optical switch constructed by stacking four stage structures described above as viewed in a direction perpendicular to the channels. The first diffraction grating layer H1, H2, H3 or H4 and the second diffraction grating layer H1', H2', H3' or H4' at each stage are represented in such a form that they are formed on the opposite faces of a common transparent flat plate G1, G2, G3 or G4 (refer to thick lines).

Also in this instance, a microlens array (collimate means) 31 for collimating light emerging from eight optical fibers LF is provided on the input side of the 8-input 8-output optical space switch including the first to the fourth optical space switch stages NW1 to NW4 described above, and another microlens array (light converging means) 32 for converging and introducing eight light beams into eight different optical fibers LF is provided on the output side of the 8-input 8-output optical space switch. It is to be noted that reference numeral 40 in FIG. 13 denotes a half-wave plate.

The stacking structure shown in FIG. 13 can be dimensioned such that, for example, when the channel distance is 1.8 mm, the input face has a size of 7.2×5.4 mm and the length in a thicknesswise direction is about 18 mm or so. However, the dimensions are only of an effective portion of the optical path polarization switching section but do not include dimensions of wires for driving the polarization controlling elements and coupling portions to the optical fibers.

In this manner, the 8-input 8-output optical space switch is constructed such that four optical space switch stages each including polarization controlling means and first and second diffraction grating layers stacked integrally with each other without having an air layer therein are stacked integrally with each other without having an air layer therein.

In this manner, a multistage optical cross connect switch of the two-dimensional channel arrangement can be realized by stacking one or more wavelength plates and a plurality of stage structures for shifting optical paths in different directions, each including a two-dimensional combination of unit structures in each of which a polarization condition of light is controlled by means for switching a linear polarization plane of light between conditions of two orthogonal directions and a pair of diffraction grating layers to shift optical paths. Further, since an optical path modifying section of the optical space switch has a stacking structure of a polarization controlling element and diffraction gratings, it is simple in construction and is suitable for two-dimensionally arranged channels. While each of diffraction grating layers constituting the stages has a plurality of segments, most of them are common while they are different in direction or front-rear orientation and advantageously the number of different types of parts is not so much as the number of involved diffraction grating layers. Further, since modification of optical paths at each stage takes place between adjacent channels, the lengths of the optical paths required therefor are minimized and it is possible to reduce the distance between channels.

Figure 14:
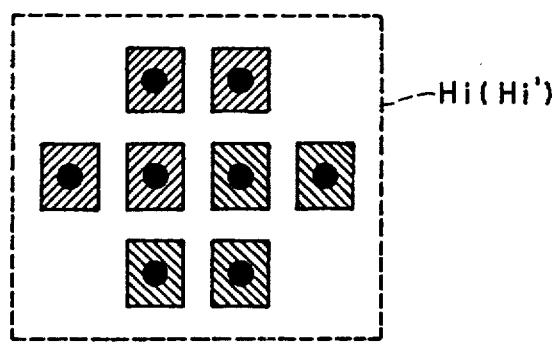
FIG. 14 is a schematic illustrating showing another holographic diffraction grating layer.

It is to be noted that the size of a segment may be designed with dimensions taking a diameter of a beam, a shift of a beam involved in variation in wavelength and a margin into consideration. Therefore, while regions in which diffraction gratings are present are shown in a mutually contacting form in FIGS. 8 and 12, when it is taken into consideration that it is desirable to minimize the diffraction gratings, such construction as shown in FIG. 14 may be employed wherein, in order to minimize a margin, a region in which no diffraction grating is present is provided at a boundary of each segment such that all channels may be surrounded, at a first diffraction grating layer Hi (i is a natural number) and a second diffraction grating layer Hi', by a boundary having a predetermined width in which no diffraction grating is formed, in order to reduce crosstalk.

(d) Description of the Fourth Embodiment

Figure 15:
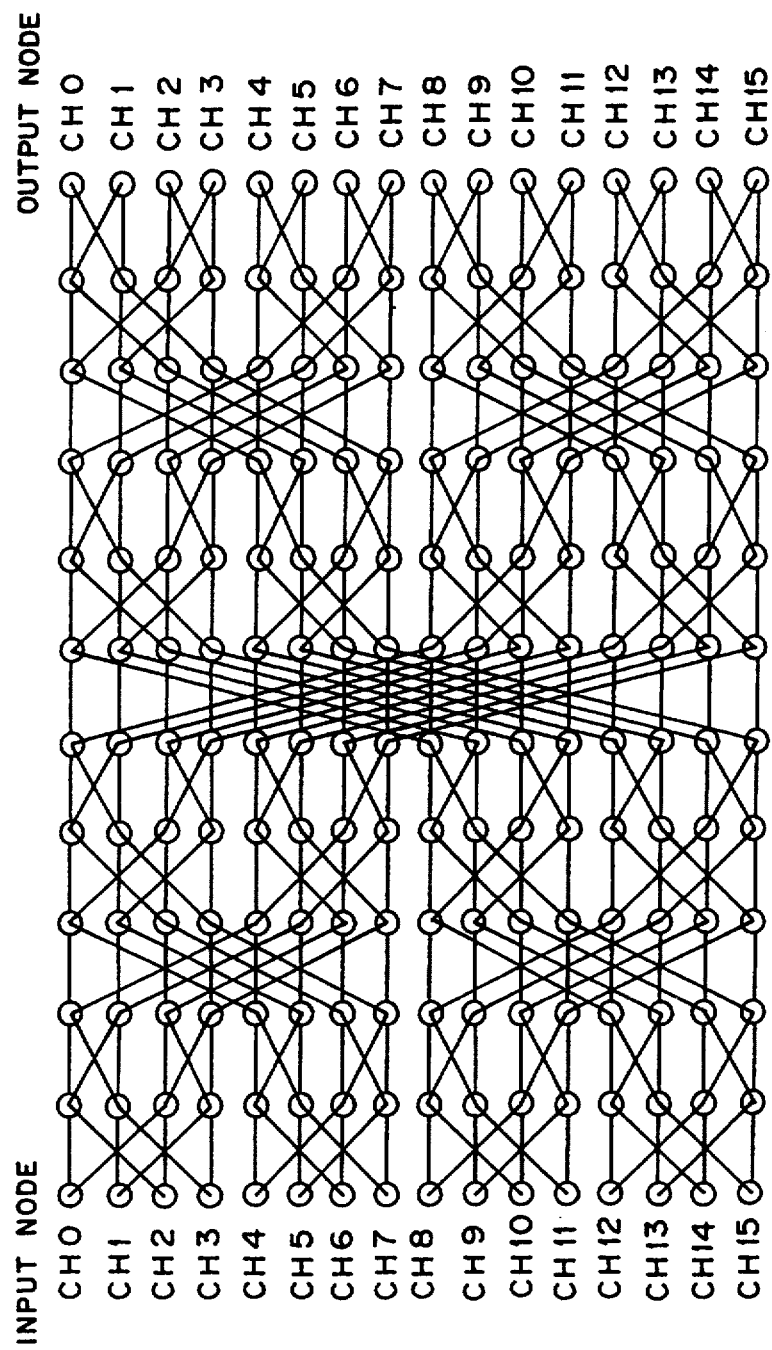
FIG. 15 is an equivalent circuit diagram of an 11 stage cross Banyan network according to a fourth preferred embodiment of the present invention.

FIG. 15 shows an optical space switch device according to a fourth preferred embodiment of the present invention. The optical space switch device of the present embodiment has an equivalent circuit structure of an 11 stage cross Banyan network. The optical space switch device includes unit switches each of which is such a 2-input 2-output optical switch as described hereinabove with reference to FIG. 1(a).

The optical space switch device according to the present embodiment having an equivalent circuit structure of an 11 stage cross Banyan network can be constructed by stacking a wavelength plate and a plurality of stage structures for shifting optical paths in different directions each including a two-dimensional combination of unit structures in each of which a polarization condition of light is controlled by such means 10 for switching a linearly polarized light beam between conditions of two orthogonal directions and a pair of diffraction grating layers 22 and 23 as described above. With the construction, the lengths of beams and the difference between the optical lengths of the beams can be minimized, and a multistage optical cross switch of a two-dimensional channel arrangement can be realized.

In short, an optical space switch apparatus having an equivalent circuit structure of an 11 stage cross Banyan network is constructed by stacking 11 optical space switch stages each including a plurality of such 2-input 2-output optical switches as shown in FIG. 1(a) or 2, which are disposed such that planes defined by each 2 parallel optical axes thereof may extend in parallel to each other.

Then, in order to realize the wiring scheme equivalent to the wiring scheme of the 16-input 16-output eleven stage cross connect switch shown in FIG. 15 using a 2-input 2-output optical switch making the basic construction described above, it is necessary to stack suitable hologram arrays for polarization of beams for each stage, and besides, sixteen input beams are arranged two-dimensionally so as to achieve matching with a multichannel multistage switching operation of the hologram arrays.

Figure 16:
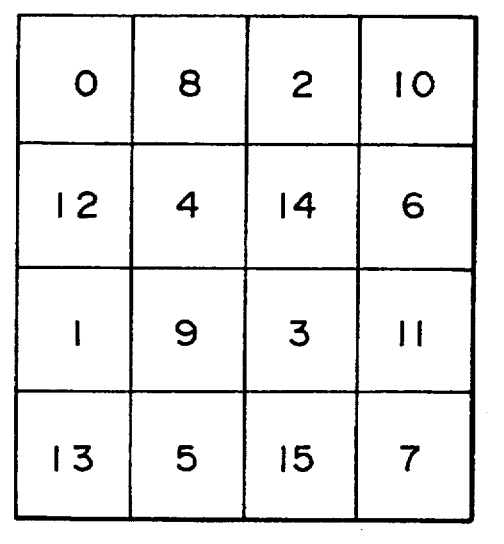
Figure 17:
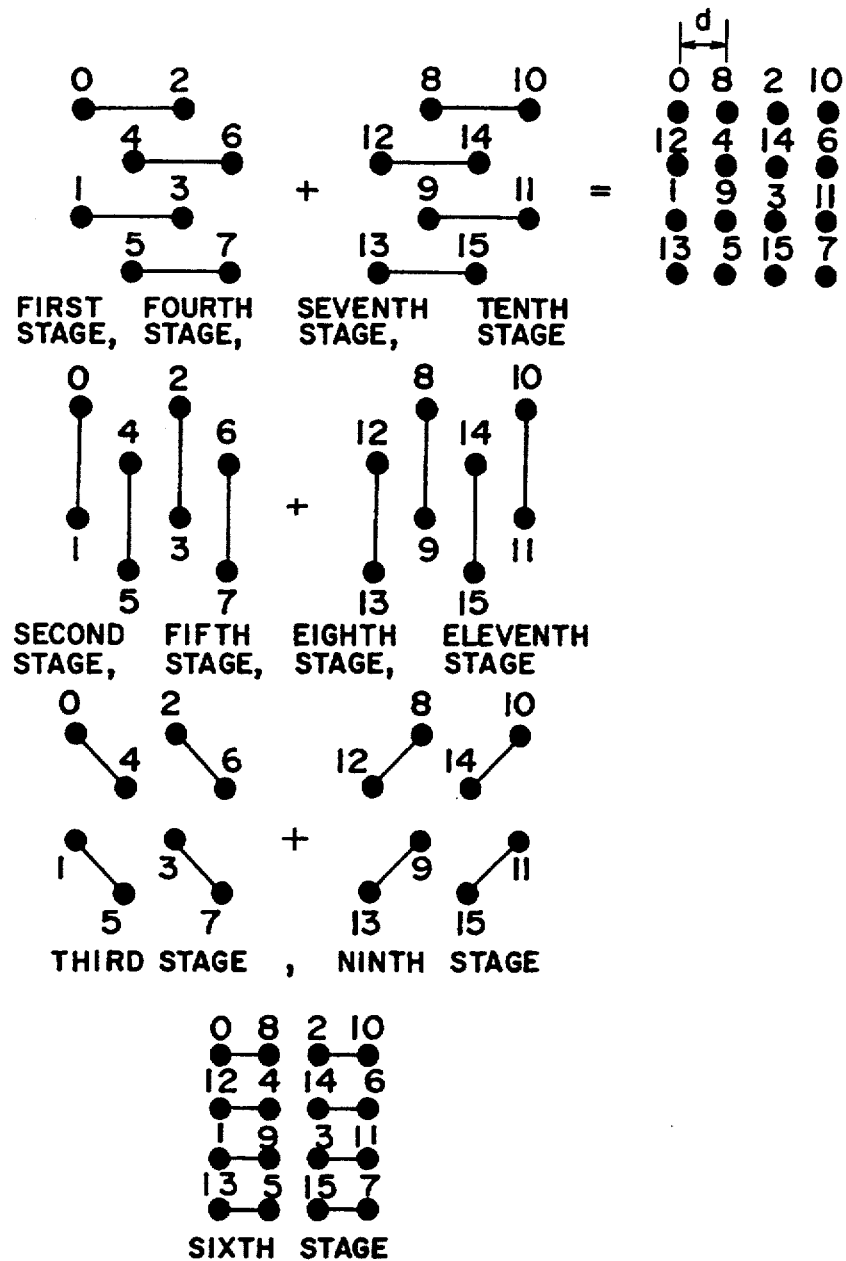
FIG. 17 is a diagrammatic view illustrating parallel channel arrays at different stages constituting the 11 stage 16×16 cross connect switch.

When 16 input beams are arranged two-dimensionally as shown in FIG. 16, that is, when, representing the adjacent channel distance by d and disposing the channel 0 (CH0) at the origin 0 (0, 0), the channel 1 (CH1) is disposed at (0, −2d); the channel 2 (CH2) at (2d, 0); the channel 3 (CH3) at (2d, −2d); the channel 4 (CH4) at (d, −d) ; the channel 5 (CH5) at (d, −3d); the channel 6 (CH6) at (3d, −d); the channel 7 (CH7) at (3d, −3d); the channel 8 (CH8) at (d, 0); the channel 9 (CH9) at (d, −2d); the channel 10 (CH10) at (3d, 0); the channel 11 (CH11) at (3d, −2d); the channel 12 (CH12) at (0, −d); the channel 13 (CH13) at (0, −3d); the channel 14 (CH14) at (2d, 0 −d); and the channel 15 (CH15) at (2d, −3d), as shown in FIG. 17, at the first, fourth, seventh and tenth optical space switch stages (first, fourth, seventh and tenth stages), a beam can be shifted between the channels 0–2, 4–6, 1–3, 5–7, 8–10, 12–14, 9–11 and 13–15; a beam can be shifted between the channels 0–1, 4–5, 2–3, 6–7, 12–13, 8–9, 14–15 and 10–11 at the second, fifth, eighth and eleventh optical space switch stages (second, fifth, eighth and eleventh stages); a beam can be shifted between the channels 0–4, 1–5, 2–6, 3–7, 8–12, 9–13, 10–14 and 11–15 at the third and ninth optical space switch stages (third and ninth stages); and a beam can be shifted between the channels 0–8, 12–4, 1–9, 13–5, 2–10, 14–6, 3–11 and 15–7 at the sixth optical space switch stage (sixth stage).

The equivalent circuit of FIG. 15 is thus constructed. Further, with an optical channel structure wherein the equivalent circuit can be realized by a combination of the basic constructions of a thin film multistage optical space switch described above, if incidence of S-polarized light is assumed, then a non-blocking cross connect routing algorithm present and can be described in the following manner.

Where NB(I) is the Ith bit of the binary represented address of each node at each stage, FB(J) is the Jth bit of the binary represented address of destination node, PS is the polarization of the input beam at each node having the value "0" when the polarization of the input beam to the node is P-polarization but having the value "1" when such polarization is S-polarization, and SC is the state of the polarization controlling switch (=0: OFF and =1: ON), polarization switch setting is provided such that, for the first, fourth, seventh and tenth stages,

SC=PS XOR (NB(3) XOR FB(3))

for the second, fifth, eighth and eleventh stages,

SC=PS XOR (NB(4) XOR FB(4))

for the third and ninth stages,

SC=PS XOR (NB(2) XOR FB(2)), and for the sixth stage,

SC=PS XOR (NB(1) XOR FB(1))

where X XOR Y signifies exclusive OR of X and Y.

With such construction, when the two-dimensional arrangement of channels for input beams is determined in such a manner as described above, if routes of beams are represented in permutation of channel numbers of corresponding beam spots of the layers, then the following 16 exchange routes of the equivalent circuit are available:

| | |
|---|---|
| (1) | 0 - 2 - 3 - 7 - 5 - 4 - 12 - 14 - 15 - 11 - 9 - 8 |
| (2) | 1 - 3 - 2 - 6 - 4 - 5 - 13 - 15 - 14 - 10 - 8 - 9 |
| (3) | 2 - 0 - 1 - 5 - 7 - 6 - 14 - 12 - 13 - 9 - 11 - 10 |
| (4) | 3 - 1 - 0 - 4 - 6 - 7 - 15 - 13 - 12 - 8 - 10 - 11 |
| (5) | 4 - 6 - 7 - 3 - 1 - 0 - 8 - 10 - 11 - 15 - 13 - 12 |
| (6) | 5 - 7 - 6 - 2 - 0 - 1 - 9 - 11 - 10 - 14 - 12 - 13 |
| (7) | 6 - 4 - 5 - 1 - 3 - 2 - 10 - 8 - 9 - 13 - 15 - 14 |
| (8) | 7 - 5 - 4 - 0 - 2 - 3 - 11 - 9 - 8 - 12 - 14 - 15 |
| (9) | 8 - 10 - 11 - 15 - 13 - 12 - 4 - 6 - 7 - 3 - 1 - 0 |
| (10) | 9 - 11 - 10 - 14 - 12 - 13 - 5 - 7 - 6 - 2 - 0 - 1 |
| (11) | 10 - 8 - 9 - 13 - 15 - 14 - 6 - 4 - 5 - 1 - 3 - 2 |
| (12) | 11 - 9 - 8 - 12 - 14 - 15 - 7 - 5 - 4 - 0 - 2 - 3 |
| (13) | 12 - 14 - 15 - 11 - 9 - 8 - 0 - 2 - 3 - 7 - 5 - 4 |
| (14) | 13 - 15 - 14 - 10 - 8 - 9 - 1 - 3 - 2 - 6 - 4 - 5 |
| (15) | 14 - 12 - 13 - 9 - 11 - 10 - 2 - 0 - 1 - 5 - 7 - 6 |
| (16) | 15 - 13 - 12 - 8 - 10 - 11 - 3 - 1 - 0 - 4 - 6 - 7 |

—continued

The routes given above can all be realized by the equivalent circuit of FIG. 15 and correspond one by one to channel connections constructed by the hologram arrays of FIG. 17, and can thus be cross connect routed non-blockingly by ON/OFF control of the polarization controlling elements.

Accordingly, if the exchange routes of the channels are traced, then it can be seen that routes in the equivalent circuit and the two-dimensional multilayer switch coincide with each other, which is an effective construction.

In this instance, while actually there are 16 factorial (16!) cross connect routes, since here the structure is such that a 4-input 4-output non-blocking network structure having a cross connect routing property is expanded to a 16-input 16-output scheme by butterfly connection while maintaining the non-blocking property, the non-blocking property is assured.

In this manner, since a small size multi-input multi-output optical space switch of the thin film stacking structure is constructed by a combination of polarization controlling elements and hologram diffraction elements, a two-dimensional arrangement of 16 beams is available, and non-blocking cross connect routing of a 16-input 11 stage cross Banyan network can be realized optically by polarization control.

(e) Description of the Fifth Embodiment

Figure 18:
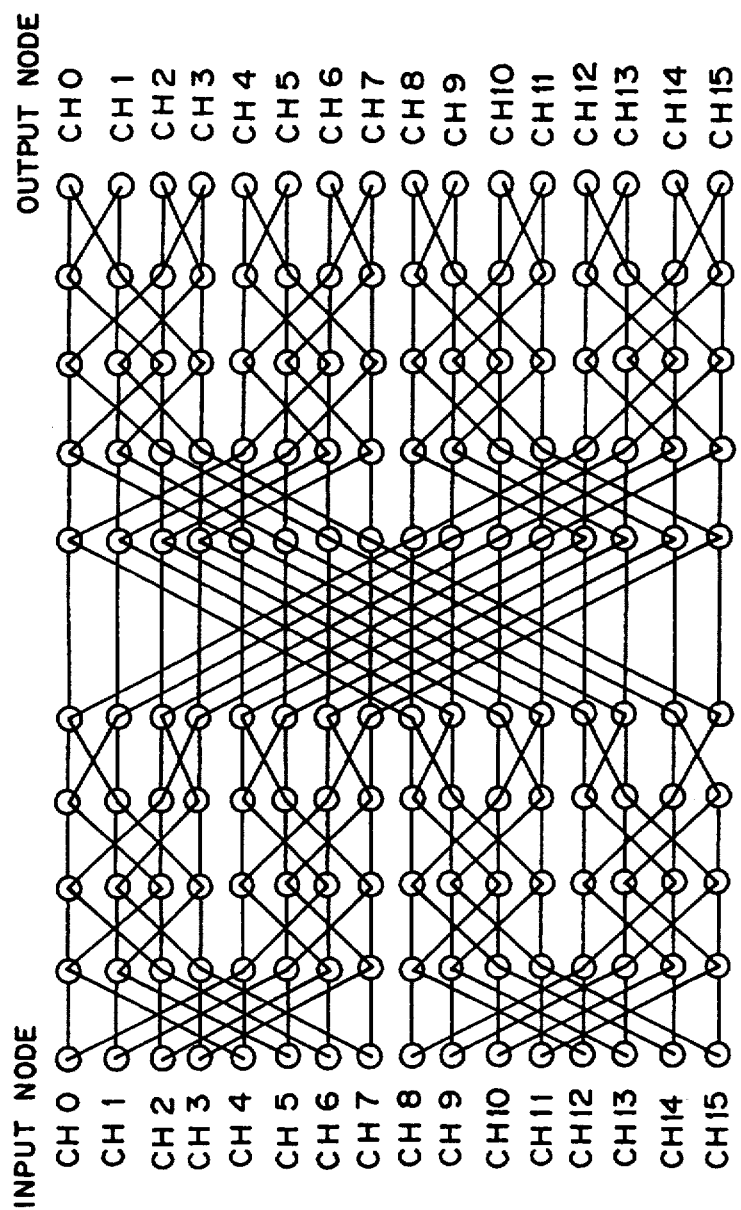
FIG. 18 is an equivalent circuit diagram of a 9 stage expanded modified Banyan network according to a fifth preferred embodiment of the present invention.

FIG. 18 shows an optical space switch device according to a fifth preferred embodiment of the present invention. The optical space switch device of the present embodiment has an equivalent circuit structure of a 9 stage expanded modified Banyan network (the equivalent circuit is equivalent to a wiring scheme of a 16-input 16-output 9 stage cross connect switch). In this instance, the optical space switch device having an equivalent circuit structure of a 9 stage expanded modified Banyan network is constructed by stacking 9 optical space switch stages each including a plurality of such 2-input 2-output optical switches as shown in FIG. 1(a) or 2, which are disposed such that planes defined by each 2 parallel optical axes thereof may extend in parallel to each other.

Figure 19:
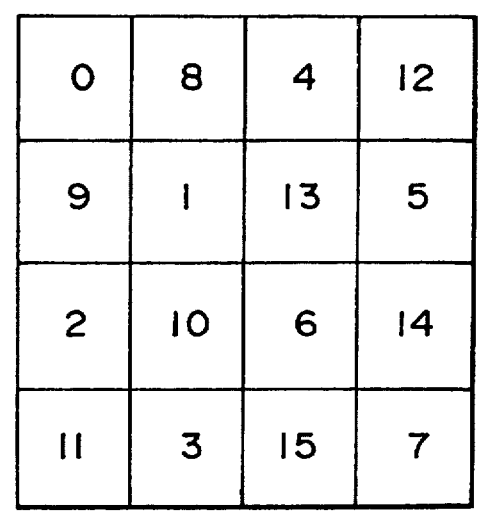

In this instance, in order to realize the wiring scheme described above with such a basic construction as shown in FIG. 1(a) or 2, when 16 input beams are arranged two-dimensionally as shown in FIG. 19, that is, when, representing the adjacent channel distance by d and disposing the channel 0 (CH0) at the origin 0 (0, 0) on the light incidence plane, the channel 1 (CH1) is disposed at (d, −d); the channel 2 (CH2) at (0, −2d); the channel 3 (CH3) at (d, −3d); the channel 4 (CH4) at (2d, 0); the channel 5 (CH5) at (3d, −d); the channel 6 (CH6) at (2d, −2d); the channel 7 (CH7) at (3d, −3d); the channel 8 (CH8) at (d, 0); the channel 9 (CH9) at (0, −d); the channel 10 (CH10) at (d, −2d); the channel 11 (CH11) at (0, −3d); the channel 12 (CH12) at (3d, 0); the channel 13 (CH13) at (2d, −d); the channel 14 (CH14) at (3d, −2d); and the channel 15 (CH15) at (2d, −3d), the hologram arrays at the individual stages are disposed such that, at the first and sixth optical space switch stages (first and sixth stages), a beam can be shifted between the channels 0–4, 1–5, 2–6, 3–7, 8–12, 9–13, 10–14 and 11–15; a beam can be shifted between the channels 0–2, 1–3, 4–6, 5–7, 9–11, 8–10, 13–15 and 12-14 at the second, third, seventh and eighth optical space switch stages (second, third, seventh and eighth stages); a beam can be shifted between the channels 0-1, 2-3, 4-5, 6-7, 8-9, 10-11, 12-13 and 14-15 at the fourth and ninth optical space switch stages (fourth and ninth stages); and a beam can be shifted between the channels 0-8, 1-9, 2-10, 3-11, 4-12, 5-13, 6-14 and 7-15 at the fifth optical space switch stage (fifth stage).

The equivalent circuit of FIG. 18 is thus constructed. Further, with an optical channel structure wherein the equivalent circuit can be realized by a combination of the basic constructions of a thin film multistage optical space switch, if incidence of S-polarized light is assumed, then a non-blocking cross connect routing algorithm is present and can be described in the following manner.

Where NB(I) is the Ith bit of the binary represented address of each node at each stage, FB(J) is the Jth bit of the binary represented address of a destination node, PS is the polarization of the input beam at each node having the value "0" when the polarization of the input beam to the node is P-polarization but having the value "1" when such polarization is S-polarization, and SC is the state of the polarization controlling switch (=0: OFF and =1: ON), polarization switch setting is provided such that, for the first, third, fourth, sixth, eighth and ninth stages,

SC=PS XOR (NB(M) XOR FB(M))

where M=2, 3, 4, 2, 3, 4 in this order for the stages, for the second and seventh stages, SC=PS XOR (NB(3) XOR FB(3)), and for the fifth stage,

SC=PS XOR (NB(1) XOR FB(1))

where, also in this instance, X XOR Y signifies exclusive OR of X and Y.

With such construction, when the two-dimensional arrangement of channels for input beams is determined in such a manner as described above, if routes of beams are represented in permutation of channel numbers of corresponding beam spots of the layers, then the following 16 exchange routes of the equivalent circuit are available:

| | |
|---|---|
| (1) | 0 - 4 - 6 - 4 - 5 - 13 - 9 - 11 - 9 - 8 |
| (2) | 1 - 5 - 7 - 5 - 4 - 12 - 8 - 10 - 8 - 9 |
| (3) | 2 - 6 - 4 - 6 - 7 - 15 - 11 - 9 - 11 - 10 |
| (4) | 3 - 7 - 5 - 7 - 6 - 14 - 10 - 8 - 10 - 11 |
| (5) | 4 - 0 - 2 - 0 - 1 - 9 - 13 - 15 - 13 - 12 |
| (6) | 5 - 1 - 3 - 1 - 0 - 8 - 12 - 14 - 12 - 13 |
| (7) | 6 - 2 - 0 - 2 - 3 - 11 - 15 - 13 - 15 - 14 |
| (8) | 7 - 3 - 1 - 3 - 2 - 10 - 14 - 12 - 14 - 15 |
| (9) | 8 - 12 - 14 - 12 - 13 - 5 - 1 - 3 - 1 - 0 |
| (10) | 9 - 13 - 15 - 13 - 12 - 4 - 0 - 2 - 0 - 1 |
| (11) | 10 - 14 - 12 - 14 - 15 - 7 - 3 - 1 - 3 - 2 |
| (12) | 11 - 15 - 13 - 15 - 14 - 6 - 2 - 0 - 2 - 3 |
| (13) | 12 - 8 - 10 - 8 - 9 - 1 - 5 - 7 - 5 - 4 |
| (14) | 13 - 9 - 11 - 9 - 8 - 0 - 4 - 6 - 4 - 5 |
| (15) | 14 - 10 - 8 - 10 - 11 - 3 - 7 - 5 - 7 - 6 |
| (16) | 15 - 11 - 9 - 11 - 10 - 2 - 6 - 4 - 6 - 7 |

Figure 20:
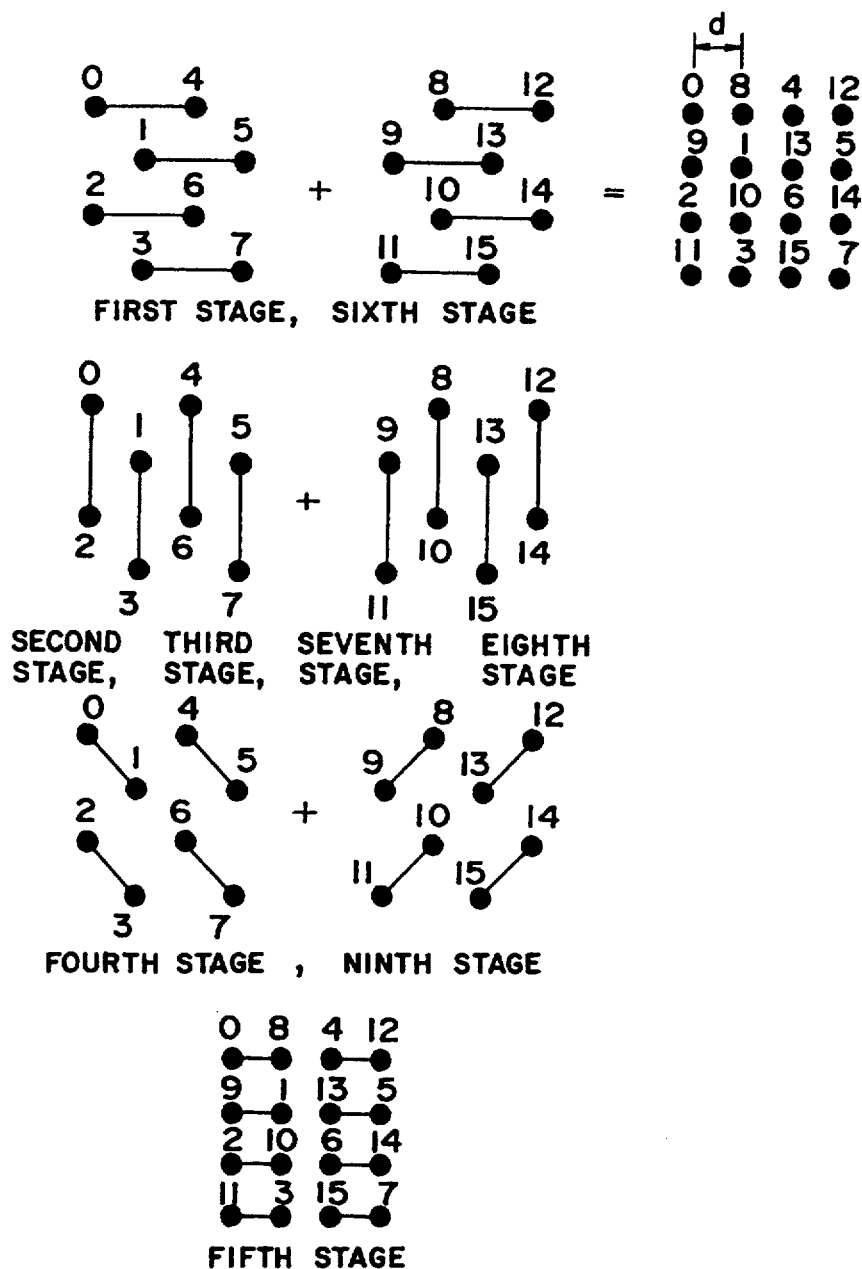
FIG. 20 is a diagrammatic view illustrating parallel channel arrays at different stages constituting the 9 stage 16×16 cross connect switch.

The routes given above can all be realized by the equivalent circuit of FIG. 18 and correspond one by one to channel connections constructed by the hologram arrays of FIG. 20, and can thus be cross connect routed non-blockingly by ON/OFF control of the polarization controlling elements.

Accordingly, also in this instance, if the exchange routes of the channels are traced, then it can be seen that routes in the equivalent circuit and the two-dimensional multilayer switch coincide with each other, which is an effective construction. Further, while actually there are 16 factorial (16!) cross connect routes also in this instance, the non-blocking property is assured due to a similar reason as described above.

Figure 21:
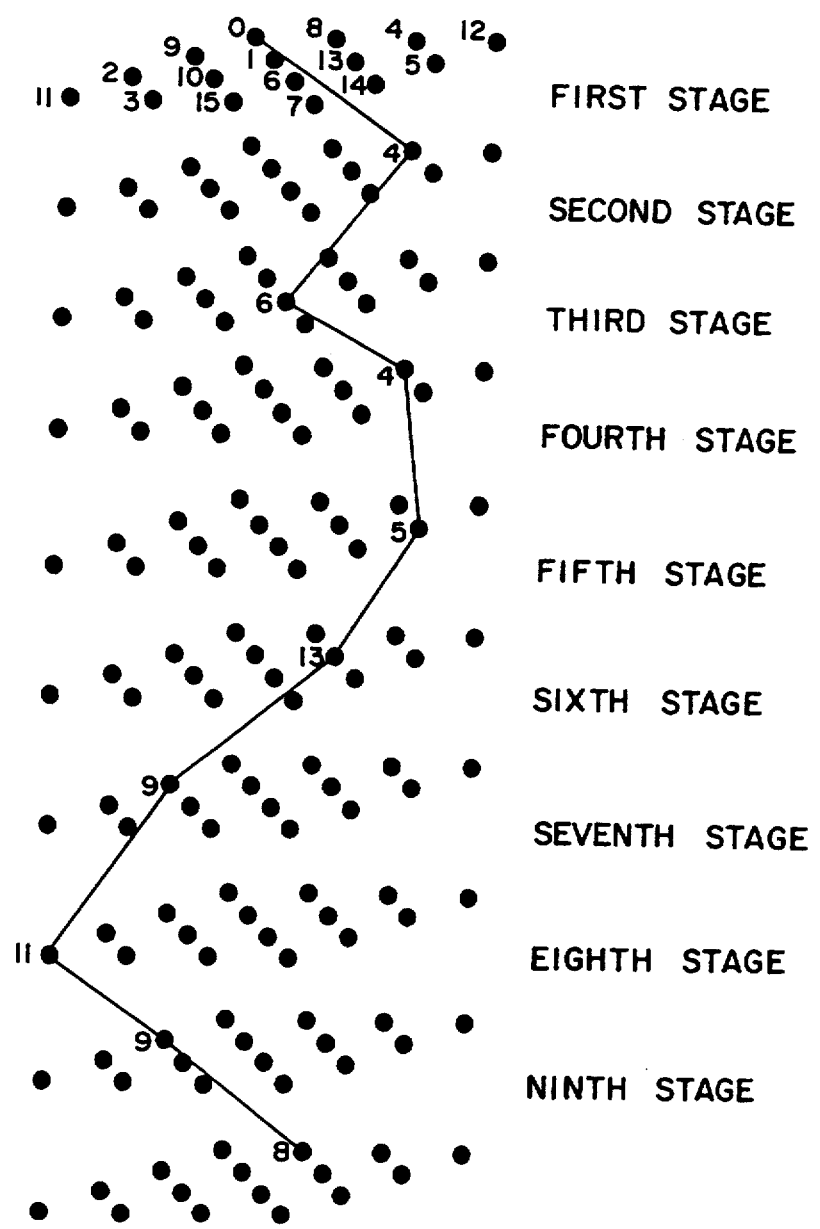
FIG. 21 is a schematic view showing a three-dimensional structure of the 9 stage modified Banyan network of FIG. 18.
Figure 22:
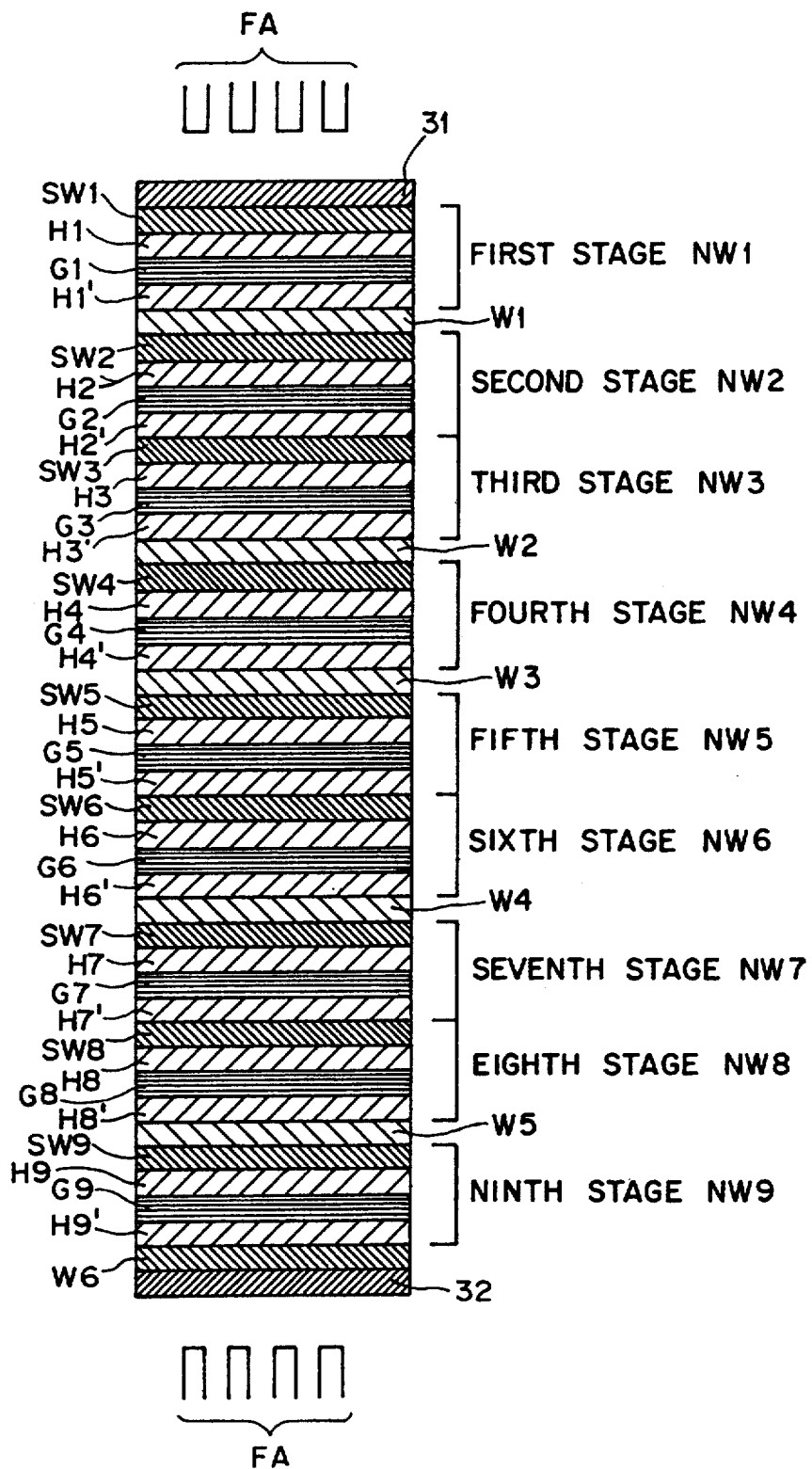
FIG. 22 is a schematic view showing an exemplary stacking structure of the 9 stage modified Banyan network of FIG. 18.

It is to be noted that the present holographic Banyan optical space switch is embodied in a 9 stage stacking structure as shown in FIG. 22. Here, a polarization controlling element SWi at each stage NWi is formed in a condition surrounded by a pair of two-dimensional transparent electrodes, and the present holographic Banyan stacking structure has a stacking structure wherein blocks each formed from a transparent glass plate Gi and first and second diffraction grating layers Hi and Hi' formed on the opposite faces of the transparent glass plate Gi and the polarization controlling elements SWi are alternately adhered to each other. It is to be noted that a half-wave plate Wj is interposed between each necessary adjacent ones of the stages. Incident light and emergent light are introduced by optical fiber arrays FA, and a pair of microlens arrays 31 and 32 are provided on the opposite sides of the stages in order to obtain collimated light. FIG. 21 shows a nine stage stacked solid structure.

A two-dimensional arrangement of 16 beams is available also with the construction described above, and non-blocking cross connect routing of a 16-input nine stage expanded modified Banyan network can be realized optically by polarization control.

(f) Description of the Sixth Embodiment

Subsequently, a sixth preferred embodiment of the present invention will be described. The sixth embodiment provides an optical space switch device having an equivalent circuit structure of a $2^n$-input (n is an integer equal to or greater than 4) expanded modified Banyan network.

Figure 23:
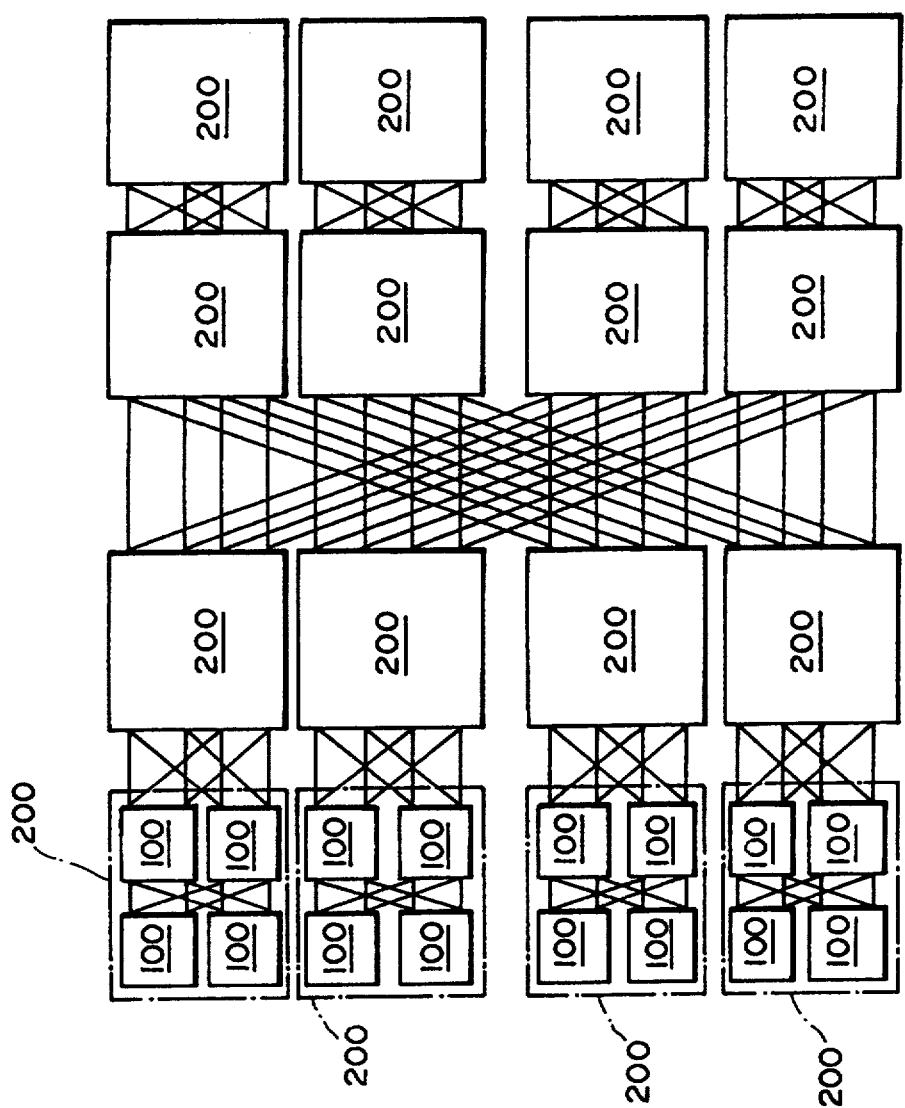
FIG. 23 is a block diagram showing an exemplary equivalent circuit of a $2^n$ stage expanded Banyan network according to a sixth preferred embodiment of the present invention.

In addition, the fundamental principle of the present invention can be applied, when an equivalent circuit of a multistage connection network is given, to implementation of the same if it can be constructed by a combination of 2-input 2-output switches. Particularly, using a thin film multistage optical space switch of the 8-input modified Banyan network type as a basic construction module, it can be expanded to optical space switches of the 16-input, 32-input or 64-input type or so as shown in FIG. 23 while maintaining the non-blocking property of the 8-input modified Banyan network. The $2^n$-input expanded modified Banyan network shown in FIG. 23 is constructed in this manner.

Referring to FIG. 23, a circuit 100 is equivalent to the 16-input g stage expanded modified Banyan network shown in FIG. 9 which is considered to be an aggregate of 8-input modified Banyan networks, and a circuit 200 includes four such 16-input 9 stage expanded modified Banyan networks 100.

In this instance, the polarization controlling algorithm for an 8-input modified Banyan network is successively expanded to allow non-blocking cross connect routing for $2^n$ inputs.

In particular, the polarization controlling algorithm for an 8-input modified Banyan network is such as follows. First, where NB(I) is the Ith bit of the binary represented address of each node at each stage, FB(J) is the Jth bit of the binary represented address of a destination node. PS is the polarization of the input beam at each node having the value "0" when the polarization of the input beam to the node is P-polarization but having the value "1" when such polarization is S-polarization, and SC is the state of the polarization controlling switch (=0: OFF and =1: ON), polarization switch setting is provided such that.

for the first, third and fourth stages,

SC=PS XOR (NB(M) XOR FB(M))

where M=1, 2, 3 in this order for the stages, and for the second stage,
SC=PS XOR FB(2)

where, also in this instance, X XOR Y signifies exclusive OR of X and Y.

Figure 24:
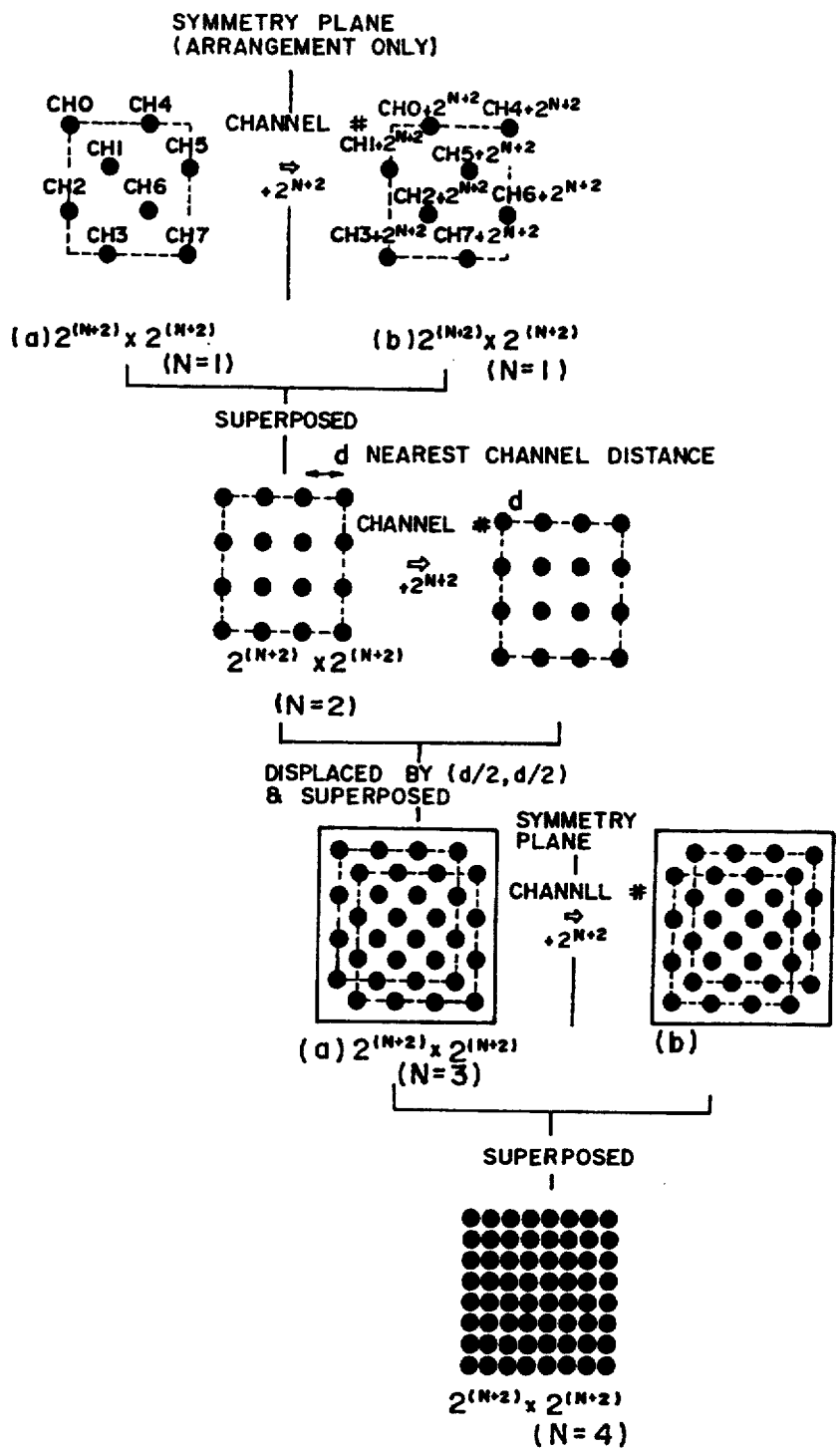
FIG. 24 is a diagrammatic view illustrating a manner of expanding a two-dimensional arrangement configuration when $2^{N+2}$ inputs are involved in the cross connect switch of the sixth embodiment.

Further, a method of successively expanding an 8-input two-dimensional arrangement to 16-, 32- and 64-input two-dimensional arrangements is present as shown in FIG. 24 and represented in the following manner.

First, when N of $2^{N+2}$ inputs (N=2m: m=1, 2, 3 ... ) is an odd number:
 (1) A second arrangement which is horizontally symmetrical with an original arrangement of $2^{N+2}$ channels is made separately.
 (2) Channel numbers equal to or greater than $2^{N+2}$ are applied to the second channel arrangement while maintaining, the order of rows and the order of columns in each row of the original channel arrangement.
 (3) The two channel arrangements are overlaid to make a further arrangement of $2^{N+3}$ channels.

On the other hand, when N of the $2^{N+2}$ inputs is an even number:
 (1) A second arrangement which is the same as an original arrangement of $2^{N+2}$ channels is made separately.
 (2) Channel numbers equal to or greater than $2^{N+2}$ are applied to the second channel arrangement while maintaining the order of rows and the order of columns in each row of the original channel arrangement.
 (3) The two channel arrangements are overlaid in a displaced condition by one half the minimum channel distance d in two orthogonal directions to make a further arrangement of $2^{N+3}$ channels.

Thus, in the sixth embodiment, the multi-input multi-output optical space switch constructed based on the basic switch shown in FIG. 1(a) or (2) can be regarded as an optical space switch device which has an equivalent circuit of a $2^n$-input expanded modified Banyan network which can be realized by successively expanding 8-input modified Banyan networks, which can be realized by a combination of such basic switches and are used as a basic construction module, by butterfly connection, and as an optical space switch device which has a polarization controlling algorithm which is based on a polarization controlling algorithm which realizes non-blocking cross connect routing of an 8-input modified Banyan network and can be successively expanded and applied to $2^n$-input expanded modified Banyan networks, and further as an expansion of a two-dimensional arrangement scheme of $2^{n+2}$ beams incident to an optical channel structure which can be realized in accordance with an equivalent circuit of the $2^n$-input expanded modified Banyan network described above.

In this manner, the optical space switch of the sixth embodiment having expansibility of a two-dimensional arrangement has optical channels represented by an equivalent circuit of a $2^{N+2}$-input expanded modified Banyan network and has a polarization controlling algorithm which makes non-blocking cross connect routing possible.

Non-blocking cross connect routing of a $2^{N+2}$-input expanded modified Banyan network can be realized optically even with the construction.

The present invention is not limited to the specifically described embodiment, and variations and modifications may be made without departing from the scope of the present invention.

What is claimed is:

1. An optical space switch, first and second optical axes extending therethrough in parallel, spaced relationship in a common plane, and having respective, first and second light input positions at which first and second lights are received and respective first and second light output positions, comprising:

a polarization controlling layer disposed transversely to the first and second optical axes and through which extend the first and second optical axes, the polarization control layer being selectively operable for switching a polarization plane of each light transmitted therethrough from one to another of first and second orthogonal polarization directions; and an optical path shifting layer disposed transversely to the first and second optical axes, contiguous the polarization controlling layer and between the polarization controlling layer and the first and second light output positions, the optical path shifting layer receiving first and second lights, respectively transmitted through the polarization controlling layer along the respective first and second optical axes, and, selectively, outputting the received first and second lights at the first and second light output positions, respectively, when the polarization plane of the lights is in the first orthogonal polarization direction, and outputting the first and second lights at the second and first light output positions, respectively, when the polarization plane of the lights is in the second orthogonal polarization direction, wherein said optical path shifting layer comprises first and second diffraction grating layers disposed in a parallel and spaced relationship from each other, each of the diffraction gratings of said first and second diffraction grating layers being formed from a pair of planar diffraction gratings having different grating vectors, said optical path shifting layer being operable to shift a beam of S-polarized light by diffraction by said first and second diffraction grating layers but transmit a beam of P-polarized light through said first and second diffraction grating layers.

2. An optical space switch device as claimed in claim 1, wherein the diffraction grating of each of said diffraction grating layers has grating stripes inclined in a thicknesswise direction so that a flux of light incident perpendicular thereto may be deflected by a required angle by Bragg diffraction.

3. An optical space switch device as claimed in claim 1, wherein the diffraction grating of each of said diffraction grating layers has an asymmetrical cross section so that a flux of light incident perpendicular thereto may be deflected by a required angle by Bragg diffraction.

4. An optical space switch device as claimed in claim 3, wherein the angle at which the diffraction grating of each of said diffraction grating layers deflects a flux of light incident perpendicular thereto by Bragg is set to 48.2 degrees.

5. An optical space switch device as claimed in claim 4, wherein the diffraction grating of each of said diffraction grating layers is constructed such that the diffraction factor modulation $\Delta n$, wavelength $\lambda$ and thickness D thereof may satisfy the equation $\Delta n \cdot D \cdot \cos 48.2° = \pi \cdot \lambda$.

6. An optical space switch device as claimed in claim 1, wherein a holographic diffraction grating is employed in said diffraction grating layers.

7. An optical space switch device as claimed in claim 1, wherein said polarization controlling layer comprises a pair of transparent electrodes and a liquid crystal material held between said transparent electrodes such that a voltage may be applied across said liquid crystal material by said transparent electrodes to control a polarizing condition of said liquid crystal material, wherein said diffraction grating layers are formed integrally on a substrate on which said transparent electrodes are formed with said liquid crystal material held therebetween.

8. An optical space switch device as claimed in claim 1, wherein each of said first and second diffraction grating layers is constructed such that adjacent regions of the diffraction grating having an equal spatial frequency and having grating vectors of a same direction are joined together to eliminate a boundary therebetween.

9. An optical space switch device as claimed in claim 1, wherein each of said first and second diffraction grating layers is constructed such that all channels are surrounded by a boundary having a predetermined width in which no diffraction grating is formed.

10. An optical space switch device as claimed in claim 1, wherein said first diffraction grating layer is formed integrally on a face of a transparent flat plate, and said second diffraction grating layer is formed integrally on the other face of said transparent flat plate.

11. An optical space switch, comprising:
a plurality of optical space switch stages, each stage comprising a plurality of 2-input, 2-output optical switches;
each of said plurality of 2-input, 2-output optical switches defining first and second optical axes extending therethrough in parallel, spaced relationship in a common plane, and having respective, first and second light input positions at which first and second lights are received and respective first and second light output positions, comprising:
a polarization controlling means disposed transversely to the first and second optical axes and through which extend the first and second optical axes, selectively operable for switching a polarization plane of each light transmitted therethrough from one to another of first and second orthogonal polarization directions, and
an optical path shifting means receiving first and second lights, respectively transmitted through the polarization controlling means along the respective first and second optical axes, for, selectively, outputting the received first and second lights at the first and second light output positions, respectively, when the polarization plane of the lights is in the first orthogonal polarization direction, and outputting the first and second lights at the second and first light output positions, respectively, when the polarization plane of the lights is in the second orthogonal polarization direction; and
the plurality of 2-input, 2-output optical switches of each said optical space switch stage being disposed with the respective, common planes, of the respective first and second optical axes, in parallel;
wherein said optical path shifting means comprises first and second diffraction grating layers disposed in a parallel and spaced relationship from each other, each of the diffraction gratings of said first and second diffraction grating layers formed from a pair of planar diffraction gratings having different grating vectors, said optical path shifting means being operable to shift a beam of S-polarized light by diffraction by said first and second diffraction grating layers but transmit a beam of P-polarized light through said first and second diffraction grating layers, each of said first and second diffraction grating layers being constructed such that a plurality of pairs of planar diffraction grating segments having different grating vectors in each pair are arranged two-dimensionally such that a beam of light may be shifted between adjacent channels in accordance with a polarization condition of the beam.

12. An optical space switch, comprising:
a plurality of optical space switch stages, each stage comprising a plurality of 2-input, 2-output optical switches;
each of said plurality of 2-input, 2-output optical switches defining first and second optical axes extending therethrough in parallel, spaced relationship in a common plane, and having respective, first and second light input positions at which first and second lights are received and respective first and second light output positions, comprising:
a polarization controlling means disposed transversely to the first and second optical axes and through which extend the first and second optical axes, selectively operable for switching a polarization plane of each light transmitted therethrough from one to another of first and second orthogonal polarization directions, and
an optical path shifting means receiving first and second lights, respectively transmitted through said polarization controlling means along the respective first and second optical axes, and, selectively, outputting the received first and second lights at the first and second light output positions, respectively, when the polarization plane of the lights is in the first orthogonal polarization direction, and outputting the first and second lights at the second and first light output positions, respectively, when the polarization plane of the lights is in the second orthogonal polarization direction; and
the plurality of 2-input, 2-output optical switches of each said optical space switch stage being disposed with the respective, common planes, of the respective first and second optical axes, in parallel;
wherein said optical path shifting means comprises first and second diffraction grating layers disposed in a parallel and spaced relationship from each other, each of the diffraction gratings of said first and second diffraction grating layers formed from a pair of planar diffraction gratings having different grating vectors, said optical path shifting means being operable to shift a beam of S-polarized light by diffraction by said first and second diffraction grating layers but transmit a beam of P-polarized light through said first and second diffraction grating layers;

each of said optical space switch stages being formed by said polarization controlling means and first and second diffraction grating layers stacked integrally without having an air layer therein;

said optical space switch stages being stacked integrally without having an air layer therein to form a multi-input multi-output optical space switch.

13. An optical space switch, defining first and second optical axes extending therethrough in parallel, spaced relationship in a common plane, and having respective, first and second light input positions at which first and second lights are received and respective first and second light output positions, comprising:

a polarization controlling means disposed transversely to the first and second optical axes and through which extends the first and second optical axes, selectively operable for switching a polarization plane of each light transmitted therethrough from one to another of first and second orthogonal polarization directions; and an optical path shifting means receiving first and second lights, respectively transmitted through the polarization controlling layer along the respective first and second optical axes, for, selectively, outputting the received first and second lights at the first and second light output positions, respectively, when the polarization plane of the lights is in the first orthogonal polarization direction, and outputting the first and second lights at the second and first light output positions, respectively, when the polarization plane of the lights is in the second orthogonal polarization direction;

wherein said optical path shifting means comprises first and second diffraction grating layers disposed in a parallel and spaced relationship from each other, each of the diffraction gratings of said first and second diffraction grating layers being formed from a pair of planar diffraction gratings having different grating vectors, said optical path shifting means being operable to shift a beam of S-polarized light by diffraction by said first and second diffraction grating layers but transmit a beam of P-polarized light through said first and second diffraction grating layers.

14. An optical space switch as in claim 13, wherein the diffraction grating of each of said diffraction grating layers has grating stripes inclined in a thicknesswise direction so that a flux of light incident perpendicular thereto may be deflected by a required angle by Bragg diffraction.

15. An optical space switch as in claim 13, wherein the diffraction grating of each of said diffraction grating layers has an asymmetrical cross section so that a flux of light incident perpendicular thereto may be deflected by a required angle by Bragg diffraction.

16. An optical space switch as in claim 15, wherein the angle at which the diffraction grating of each of said diffraction grating layers deflects a flux of light incident perpendicular thereto by Bragg is set to 48.2 degrees.

17. An optical space switch as in claim 16, wherein the diffraction grating of each of said diffraction grating layers is constructed such that the difference factor modulation $\Delta n$, wavelength $\lambda$ and thickness D thereof may satisfy the equation $\Delta n \cdot D \cdot D \cdot \cos 48.2° = \pi \cdot \lambda$.

18. An optical space switch as in claim 13, wherein a holographic diffraction grating is employed in said diffraction grating layers.

19. An optical space switch as in claim 13, wherein said polarization controlling means comprises a pair of transparent electrodes and a liquid crystal material held between said transparent electrodes such that a voltage may be applied across said liquid crystal material by said transparent electrodes to control a polarizing condition of said liquid crystal material, said diffraction grating layers formed integrally on a substrate on which said transparent electrodes are formed with said liquid crystal material held therebetween.

20. An optical space switch as in claim 13, wherein each of said first and second diffraction grating layers is constructed such that adjacent regions of the diffraction grating having an equal spatial frequency and having grating vectors of a same direction are joined together to eliminate a boundary therebetween.

21. An optical space switch as in claim 13, wherein each of said first and second diffraction grating layers is constructed such that all channels are surrounded by a boundary having a predetermined width in which no diffraction grating is formed.

22. An optical space switch as in claim 13, wherein said first diffraction grating layer is formed integrally on a face of a transparent flat plate and said second diffraction grating layer is formed integrally on the other face of said transparent flat plate.

23. An optical space switch, comprising:

a plurality of stacked optical space switch stages, each stage comprising a plurality of 2-input, 2-output optical switches;

each of said plurality of 2-input, 2-output optical switches defining first and second optical axes extending therethrough in parallel, spaced relationship in a common plane, and having respective, first and second light input positions at which first and second lights are received and respective first and second light output positions, comprising:

a polarization controlling layer disposed transversely to the first and second optical axes and through which extend the first and second optical axes, the polarization control layer being selectively operable for switching a polarization plane of each light transmitted therethrough from one to another of first and second orthogonal polarization directions, and an optical path shifting layer disposed transversely to the first and second optical axes, contiguous the polarization controlling layer and between the polarization controlling layer and the first and second light output positions, the optical path shifting layer receiving first and second lights, respectively transmitted through the polarization controlling layer along the respective first and second optical axes, and, selectively, outputting the received first and second lights at the first and second light output positions, respectively, when the polarization plane of the lights is in the first orthogonal polarization direction, and outputting the first and second lights at the second and first light output positions, respectively, when the polarization plane of the lights is in the second orthogonal polarization direction, said optical path shifting layer comprising first and second diffraction grating layers disposed in a parallel and spaced relationship from each other, each of the diffraction gratings of said first and second diffraction grating layers formed from a pair of planar diffraction gratings having different grating vectors, said optical path shifting layer being operable to shift a beam of S-polarized light by diffraction by said first and second diffraction grating layers but transmit a beam of P-polarized light through said first and second diffraction grating layers, each of said first and second diffraction grating layers being constructed such that a plurality of pairs of planar diffraction grating segments having different grating vectors in each pair are arranged two-dimensionally such that a beam of light may be shifted between adjacent channels in accordance with a polarization condition of the beam; and the plurality of 2-input, 2-output optical switches of each said optical space switch stage being disposed with the respective, common planes, of the respective first and second optical axes, in parallel.

24. An optical space switch, comprising:

a plurality of stacked optical space switch stages, each stage comprising a plurality of 2-input, 2-output optical switches;

each of said plurality of 2-input, 2-output optical switches defining first and second optical axes extending therethrough in parallel, spaced relationship in a common plane, and having respective, first and second light input positions at which first and second lights are received and respective first and second light output positions, comprising:

a polarization controlling layer disposed transversely to the first and second optical axes and through which extend the first and second optical axes, the polarization control layer being selectively operable for switching a polarization plane of each light transmitted therethrough from one to another of first and second orthogonal polarization directions, and an optical path shifting layer disposed transversely to the first and second optical axes, contiguous the polarization controlling layer and between the polarization controlling layer and the first and second light output positions, the optical path shifting layer receiving first and second lights, respectively transmitted through the polarization controlling layer along the respective first and second optical axes, and, selectively, outputting the received first and second lights at the first and second light output positions, respectively, when the polarization plane of the lights is in the first orthogonal polarization direction, and outputting the first and second lights at the second and first light output positions, respectively, when the polarization plane of the lights is in the second orthogonal polarization direction, said optical path shifting layer comprises first and second diffraction grating layers disposed in a parallel and spaced relationship from each other, each of the diffraction gratings of said first and second diffraction grating layers formed from a pair of planar diffraction gratings having different grating vectors, said optical path shifting layer being operable to shift a beam of S-polarized light by diffraction by said first and second diffraction grating layers but transmit a beam of P-polarized light through said first and second diffraction grating layers; and the plurality of 2-input, 2-output optical switches of each said optical space switch stage being disposed with the respective, common planes, of the respective first and second optical axes, in parallel, wherein each of said optical space switch stages is formed by said polarization controlling layer and first and second diffraction grating layers stacked integrally without having an air layer therein, and said optical space switch stages are stacked integrally without having an air layer therein to form a multi-input multi-output optical space switch.

* * * * *

UNITED STATES PATENT AND TRADEMARK OFFICE
CERTIFICATE OF CORRECTION

PATENT NO. : 5,430,561
DATED : July 4, 1995
INVENTOR(S) : Masayuki KATO et al.

It is certified that error appears in the above-indentified patent and that said Letters Patent is hereby corrected as shown below:

Column 8, line 41, "Structure" should be --structure--.

Column 14, line 10, "H'" should be -- H1'--.
             line 66, "Of" should be --of--.

Column 18, line 66, "2d,0" should be -- 2d,--.

Column 22, line 57, "g" should be --9--.

Signed and Sealed this

Nineteenth Day of December, 1995

Attest:

BRUCE LEHMAN

*Attesting Officer*      *Commissioner of Patents and Trademarks*